United States Patent
Truscott et al.

(10) Patent No.: US 7,073,485 B2
(45) Date of Patent: Jul. 11, 2006

(54) ENGINE MANAGEMENT

(75) Inventors: Anthony J. Truscott, West Sussex (GB); Andrew D. Noble, West Sussex (GB); Ashu Akoachere, West Sussex (GB); Christopher J. Evans, Brighton (GB); Philippe J. F. Moulin, Rueil Malmaison (FR); Daniel J. Bowker, Worcester (GB)

(73) Assignee: Ricardo UK Limited (GB)

( * ) Notice: Subject to any disclaimer, the term of this patent is extended or adjusted under 35 U.S.C. 154(b) by 0 days.

(21) Appl. No.: 10/478,562

(22) PCT Filed: May 21, 2002

(86) PCT No.: PCT/GB02/02385
§ 371 (c)(1),
(2), (4) Date: Sep. 10, 2004

(87) PCT Pub. No.: WO02/095191
PCT Pub. Date: Nov. 28, 2002

(65) Prior Publication Data
US 2005/0039721 A1      Feb. 24, 2005

(30) Foreign Application Priority Data
May 21, 2001   (GB) ................ 0112338.9

(51) Int. Cl.
F02D 41/14 (2006.01)
F02P 5/00 (2006.01)
G06F 19/00 (2006.01)
(52) U.S. Cl. .................. 123/406.22; 123/406.41
(58) Field of Classification Search .......... 123/406.22, 123/406.41, 406.43, 435, 406.27, 406.37; 701/105, 111, 113–115; 73/117.3
See application file for complete search history.

(56) References Cited

U.S. PATENT DOCUMENTS

| | | | | |
|---|---|---|---|---|
| 4,406,265 A | * | 9/1983 | Brandt et al. | 123/406.42 |
| 4,531,499 A | | 7/1985 | Eckert et al. | |
| 4,556,030 A | | 12/1985 | Aono | |
| 4,622,939 A | * | 11/1986 | Matekunas | 123/406.41 |
| 4,633,707 A | * | 1/1987 | Haddox | 73/47 |
| 6,089,077 A | * | 7/2000 | Daniels | 73/35.08 |
| 6,178,949 B1 | | 1/2001 | Kirwan et al. | |
| 6,230,683 B1 | | 5/2001 | zur Loye et al. | |
| 6,273,064 B1 | * | 8/2001 | Scholl et al. | 123/406.24 |
| 6,484,694 B1 | * | 11/2002 | Thomas | 123/435 |

(Continued)

FOREIGN PATENT DOCUMENTS

DE    199 00 738 C1    6/2000

(Continued)

OTHER PUBLICATIONS

International Search Report dated Aug. 15, 2002 (3 pages).

*Primary Examiner*—Hai Huynh
(74) *Attorney, Agent, or Firm*—Osha Liang LLP

(57) ABSTRACT

An engine management system for an internal combustion engine, which has at least one cylinder pressure sensor and at least one engine actuator, includes a data processor arranged to receive and process cylinder pressure data from the cylinder pressure sensor and the actuator controller arranged to control the actuator to optimize engine performance based on the processed data, in which the cylinder pressure data is obtained during a performance optimized engine cycle or cycles. The processor processes the data to construct a cylinder pressure variation function for the engine cycle or cycles and derive control data therefrom for the actuator controller.

53 Claims, 17 Drawing Sheets

U.S. PATENT DOCUMENTS

| | | | |
|---|---|---|---|
| 6,553,305 B1 * | 4/2003 | Dixon et al. | 701/102 |
| 6,560,526 B1 * | 5/2003 | Matekunas et al. | 701/104 |
| 6,598,468 B1 * | 7/2003 | Zur Loye et al. | 73/117.3 |
| 6,912,459 B1 * | 6/2005 | Tanaya et al. | 701/111 |
| 2004/0216704 A1 * | 11/2004 | Kassner | 123/48 B |
| 2005/0022789 A1 * | 2/2005 | Palma et al. | 123/435 |
| 2005/0125140 A1 * | 6/2005 | Vermonet et al. | 701/114 |

FOREIGN PATENT DOCUMENTS

| | | | |
|---|---|---|---|
| JP | 7-310585 | * | 11/1995 |
| JP | 8-246941 | * | 9/1996 |

* cited by examiner

ENGINE MANAGEMENT

The invention relates to a system and method for improved engine management, in particular for an internal combustion engine.

Known engine management systems (EMS) monitor and control the running of an engine in order to meet certain pre-set or design criteria. Typically these are good driveability coupled with high fuel efficiency and low emissions. One such known system is shown schematically in FIG. 1. An internal combustion engine 10 is controlled by an engine control unit 12 which receives sensor signals from a sensor group designated generally 14 and issues control signals to an actuator group designated generally 16. The engine control unit 12 also receives external inputs from external input block 18 as discussed in more detail below.

Based on the sensor input from the sensor block 14 and any external input from the external input block 18 the engine control unit (ECU) optimises engine performance within the specified criteria.

Typically the sensor block 14 may include sensors including mass air flow sensors, inlet temperature sensors, knock detection sensors, cam sensor, air/fuel ratio (AFR) or lambda ($\lambda$) sensors, and engine speed sensors. The external input block 18 typically includes throttle or accelerator sensors, ambient pressure sensors and engine coolant temperature sensors. In a spark-ignition engine the actuator block 16 typically comprises a fuel injector control and spark plug operation control.

As a result, under variable load conditions induced by the throttle under driver control, the sensors and actuators enable effective control of the amount of fuel entering the combustion chamber in order to achieve stoichiometric AFR, and of the timing of combustion itself.

Known engine management systems suffer from various problems. EMS technology remains restricted to parameter based systems. These systems incorporate various look-up tables which provide output values based on control parameters such as set-points, boundaries, control gains, and dynamic compensation factors, over a range of ambient and engine operating conditions. For example in spark ignition engines spark timing is conventionally mapped against engine speed and engine load and requires compensation for cold starting. As well as introducing a high data storage demand, therefore, known systems require significant initial calibration. This calibration is typically carried out on a test bed where an engine is driven through the full range of conditions mapped into the look-up tables. As a result the systems do not compensate for factors such as variations between engine builds and in-service wear. Accordingly the look-up tables may be inaccurate ab initio for an individual engine, and will become less accurate still with time.

A number of engine management systems based on cylinder pressure monitoring are known. Many known systems use non-intrusive pressure sensors the accuracy of which is correspondingly limited. Where in-cylinder sensors are used these are principally found on test bed rather than production engine models. Various parameters are derived from the pressure measurements. For example it is known to monitor Indicated Mean Effective Pressure (IMEP) for an engine cycle in order to derive the work done in the cylinder. This is derived from predetermined relationships based on a range of representative pressure measurements.

Known systems also exist for identifying engine cylinder misfire based on monitoring perturbation in the flywheel speed corresponding to completed combustions. However this is inaccurate at high engine speed and low load when the perturbations are small compared to the steady-state engine speed. The problem is exacerbated as the number of cylinders increases.

In order to accommodate changes in operating conditions it has been proposed to introduce additional sensors, for example an ambient condition sensor such as a humidity sensor, into the system. However inclusion of such a sensor has not been achieved in production vehicles. Alternatively in known systems a margin is introduced into the various control parameters to take account of humidity variations, which again can be inflexible.

Known engine management systems also include a knock detection system comprising an accelerometer on the engine block as a whole which detects combustion variations with an appropriate signature. Known systems have attempted to identify which cylinder is knocking by identifying the crank angle position when knock is detected. Again such systems are inaccurate and provide only a very coarse level of knock control as a result.

Known systems also compensate for differing engine characteristics and control parameters during start-up/warm-up of an engine. In known systems extra retard is applied to an open-loop timing control depending on the engine coolant temperature so that the catalyst rapidly reaches its optimal conditions as the engine warms up as quickly as possible. However, in known systems, engineering margins are applied to ensure that the timing is not retarded beyond the combustion stability limit. As these margins are pre-set this inevitably results in a compromise on the amount of retard that can be applied.

In known systems where cylinder pressure is measured, compensation schemes have been introduced to accommodate sensor drift by estimating a pressure off-set based on the polytropic gas principle $PV^n$=constant. Such systems, however, assume a constant polytropic index n, or one that varies as a look-up table function of engine condition. Problems with such systems arise, however, as in practice n varies between cylinders and cycles both with engine temperature and with the amount of exhaust gas re-circulated.

One known document that addresses various problems associated with conventional engine management systems is Sellnau et al "Cylinder-pressure-based Engine Control using Pressure-ratio-management and Low-cost Non-intrusive Cylinder Pressure Sensors", part of the SAE Technical Paper Series 2000-01-0932 available from SAE International, 400 Commonwealth Drive, Warrendale, Pa. 15096-0001, U.S.A. A system is described in this paper in overview in which four to six pressure samples are taken by a non-intrusive pressure sensor during an engine stroke and these values are introduced into predetermined equations to derive measures of engine performance. In particular a measure of the ratio between fired pressure and derived motoring pressure (the pressure that would have existed in the cylinder if there had been no combustion) is taken at 10° after top dead centre and closed loop control is instituted to control this value to a nominal target value.

This system suffers from various problems. The very small number of samples inhibits the application of averaging techniques to reduce the effects of noise interference and identify physical parameters more accurately.

The system disclosed in Sellnau et al also uses the measured data for other factors such as exhaust gas recirculation, air-fuel ratio balancing, misfire detection, and cold start control, again suffering from the same problems. In addition, in relation to misfire detection, the control is based on a further approximation between the pressure ratio and IMEP introducing additional sources of error.

Sellnau et al further proposes a start control strategy in which completeness of combustion is estimated by monitoring the modified pressure ratio MPR which effectively represents the increase in cylinder pressure as a fraction of the motored pressure varying between 0, for complete misfire and 1 for complete combustion. This is used as a measure of combustion stability whereby MPR will be low when the spark timing is retarded too far providing a limit for spark retard during warm-up. However the MPR is derived from only a small number of samples making it more prone to signal noise.

The paper further discloses knock detection based on sensing of knock-induced vibrations having certain frequencies. However excessive filtering would be required to remove the effects of mechanical vibration arising from moving engine parts.

U.S. Pat. No. 4,556,030 to Aono relates to an engine management system in which various measures of engine performance are derived from a measurement of cylinder pressure and derivation of the motoring pressure. In order to derive the motoring pressure, the spark is retarded as far as possible incrementally over successive cycles. As the cylinder operates at motoring pressure until combustion takes place, this allows more data on the motoring pressure to be collected. However this gives rise to various problems. Firstly performance of the engine is compromised in order to collect this data, and the data must be collected over a number of cycles, the engine being progressively retarded until sufficient data is obtained. Secondly, this in turn necessitates a significant reduction in response time of the engine. Once the data is collected and the various parameters are derived, these are compared against pre-set values to establish whether the pre-set values should continue to be applied to the engine or whether they should be adjusted, treating the measured values as indicative of a systematic change in engine condition. Accordingly the pre-set values have priority and the measured values are no more than a cross-check, again reducing engine control response time.

Another known system is described in U.S. Pat. No. 4,622,939 to Matekunas. According to this arrangement four sample measurements are taken of pressure during an engine cycle using an intrusive or non-intrusive sensor. In the preferred arrangement the values are averaged over a number of cycles and if the values from a single cycle are used then additional correcting data is collected and processed. In particular the proportion fuel burnt at 10° after TDC is obtained, the estimated fuel mass fraction burnt being filtered and used as a feed-back variable to match a target value which can vary under differing operating conditions using a look-up table. Short term variation in engine operation, for example cycle to cycle variation is not accommodated or only accommodated with additional processing burden. Yet further, once again, signal filtering across a single stroke is not feasible. Zero phase shift low pass filtering is necessary to attenuate the signal noise and any perturbations at 10° caused by cylinder knock. In addition, because of the low number of samples used, further approximations are required and the values sensed are incorporated into predetermined relationships themselves based on significant approximations and assumptions. Factors such as pressure offset cannot be calculated accurately with such a system without using polytropic index estimation. Accordingly further inaccuracies are involved. Matekunas further discloses compensation for pressure sensor gain once again based on significant approximations and predetermined assumptions. As a result this calculation is also inflexible and not responsive to changes in operating conditions.

According to the invention there is provided an engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimise engine performance based on the processed data, in which the cylinder pressure data is obtained during a performance optimised engine cycle or cycles and the processor processes the data to construct a cylinder pressure variation function for the engine cycle or cycles and derive control data therefrom for the actuator controller. As a pressure variation function is constructed, improved and more accurate engine management is available based on fewer approximation than in known systems. The processor preferably processes cylinder pressure data for each cylinder in the engine and preferably for each engine cycle allowing a significant level of individual cylinder control and responsiveness. Preferably the actuator controller controls actuation for an engine cycle based on the processed cylinder pressure data from the engine cycle immediately preceding such that the most up to date data is used for control of the instant cycle.

The processor preferably further processes crank angle data and in a multi-cylinder engine data is preferably obtained for each cylinder at a respective crank angle position in the cycle or cycles of each cylinder. As a result, piston position and hence cylinder volume is obtained for each pressure reading.

The system preferably includes an in-cylinder pressure sensor for providing cylinder pressure data to the data processor. As a result accurate and direct readings are available substantially uncontaminated with engine/mechanical noise.

The engine actuator preferably comprises at least one of:
a spark plug;
a fuel injector.

The processor preferably derives an offset pressure value from the cylinder pressure and the offset pressure value is preferably derived from the polytropic gas law $PV^n=K$ using cylinder pressure data and corresponding volume data to obtain n and K. As a result off-line approximations of n or K are not required and an accurate value for the offset pressure is obtained.

In one preferred embodiment the processor derives a pressure ratio function from the constructed pressure variation function comprising a ratio between combustion and motoring pressure, the processor derives the motoring pressure for each engine cycle or cycles from the pressure sensor data in a pre-combustion phase of the engine cycle(s) and the motoring pressure derivation is based on filtered pressure sensor data. The engine actuator comprises a spark plug and the actuator controller controls the timing of firing the spark plug based on closed loop control of a pressure ratio control variable and the pressure ratio control variable is a fixed proportion of the fuel Mass Fraction Burnt (MFB), for example 50% MFB. As a result a Fuel Efficiency Mode (FEM) is achieved for the engine. In a multi-cylinder engine the pressure ratio is derived for each engine cylinder and the actuator controller controls an actuator for each engine cylinder.

In a further preferred embodiment the processor processes the pressure sensor data to obtain the indicated mean effective pressure (IMEP) and in a multi-cylinder engine the processor obtains the IMEP for each cylinder, identifies as the weakest cylinder the cylinder having the lowest IMEP and the actuator control controls each cylinder to balance the IMEP to that of the weakest cylinder. The cylinders are controlled based on a function of the pressure ratio for each cylinder and the cylinder balancing is based on closed loop control. As a result a Smooth Running Mode (SRM) is achieved for the engine. The processor obtains the gross IMEP and detects misfire if the gross IMEP falls below a threshold value and on misfire detection, the actuator controller resets to an actuator controller state prior to misfire detection. The processor further derives a function of the variance of IMEP between engine cycles and compares the function against a threshold value to determine whether a steady state condition exists and the processor switches from IMEP balancing if non-steady state is determined. Thus the system will switch from SRM to FEM under transient conditions.

In a preferred start-up mode embodiment, the processor derives a function of the variability of IMEP between engine cycles and compares the function against a threshold value, and the actuator controller controls the actuator based on this comparison. The actuator is a spark plug and the actuator controller retards the spark plug timing based on the comparison. A further actuator comprises a fuel injector and the actuator controller controls fuel injection based on the function of the IMEP variability. The actuator control is performed under closed loop control to a target IMEP variability. The start-up mode is entered based on engine coolant temperature sensor data. The IMEP variance or variability is derived iteratively as a function of a preceding variance or variability value and a current IMEP value coupled with a forgetting factor. The IMEP variance or variability iteration includes an initialisation sequence in which the forgetting factor is successively increased for each iteration to a target value.

Preferably the threshold value is based on an average of the IMEPs obtained for all cylinders during the same cycle.

The processor preferably further processes pressure sensor data to detect cylinder knock. Preferably the actuator comprises a spark plug, and the processor and actuator controller, upon knock detection, retard the spark plug timing and incrementally increase the timing for subsequent engine cycles until a spark timing threshold is reached. Preferably the actuator controller resets an actuator controller state prior to knock detection once the spark timing threshold is reached.

According to the invention there is further provided an engine management system for an internal combustion engine having a plurality of cylinders each having at least one cylinder pressure sensor and at least one engine actuator, the system comprising a data processor arranged to process cylinder pressure data from each pressure sensor in which the processor constructs a cylinder pressure variation function for each cylinder from the cylinder pressure data, derives a measure of the performance of each cylinder from the respected pressure variation function and balances the cylinder performances.

The system preferably further comprises an actuator controller arranged to control each cylinder actuator to balance cylinder performance, the actuator controller preferably controlling the cylinder spark timing.

According to the invention there is yet further provided an engine management system for an internal combustion engine having at least one cylinder pressure sensor and at least one engine actuator, the system comprising a data processor arranged to process cylinder pressure data from the pressure sensor and an actuator controller arranged to control the actuator based on the processed data in which the processor processes the cylinder pressure data to construct a cylinder pressure variation function and derive a pressure ratio control variable therefrom for the actuator controller.

The invention further includes an internal combustion engine including at least one cylinder pressure sensor, at least one engine actuator and an engine management system as described above.

The invention yet further provides a method of managing an internal combustion engine based on cylinder pressure data from a cylinder pressure sensor comprising the steps of obtaining the cylinder pressure data across one or more performance optimised engine cycles, processing the cylinder pressure data to construct a pressure variation function for the engine cycle or cycles ad controlling an engine actuator to optimise engine performance based on the constructed pressure variation function.

According to the invention there is further provided an engine management system for an internal combustion engine having at least one cylinder pressure sensor, the system comprising a sensor controller arranged to retrieve a plurality of cylinder pressure readings per cylinder cycle and a processor arranged to process the readings to construct a cylinder pressure variation function in which sufficient readings are retrieved per cycle to allow noise filtering in the pressure variation function.

Embodiments of the invention will now be described, by way of example, with reference to the drawings of which:

FIG. 4b shows additional detail relating to the compression and expansion strokes of the four-stroke cycle shown in FIG. 4a;

Figure 1:
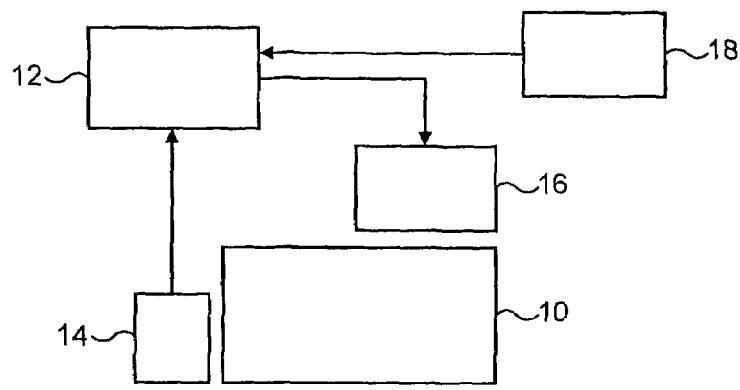
FIG. 1 is a block diagram representing a prior art EMS.

The following discussion of an embodiment of the invention relates to its implementation in relation to a four stroke spark ignition engine. However it will be appreciated that the invention can be applied equally to other stroke cycles and types of internal combustion engines including compression-ignition engines such as diesel engines, with appropriate changes to the model parameters. Those changes will be apparent to the skilled person and only the best mode presently contemplated is described in detail below. Like reference numerals refer to like parts throughout the description.

Figure 2:
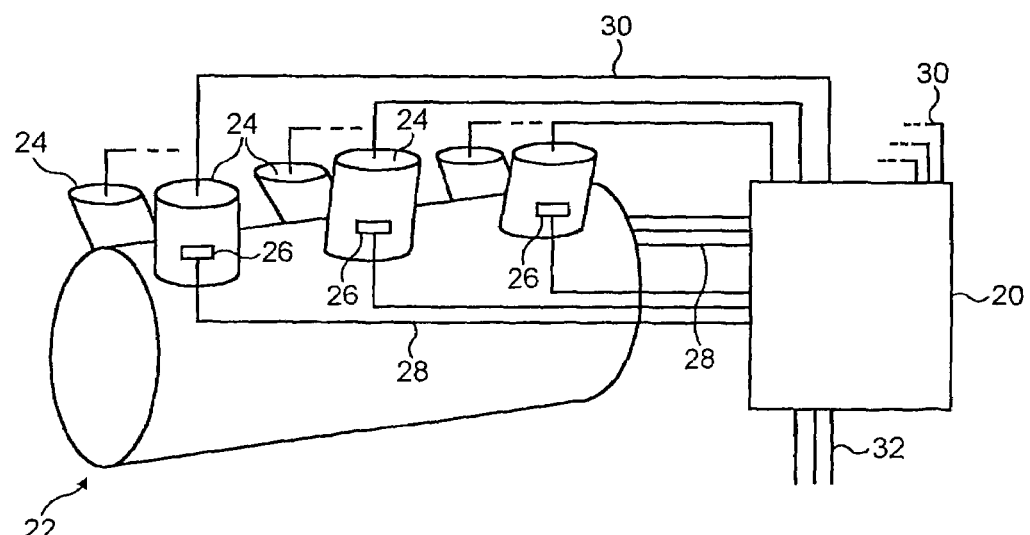
FIG. 2 is a schematic diagram representing an EMS according to the present invention.

FIG. 2 is a schematic view showing the relevant parts of an engine management system according to the present invention in conjunction with a six cylinder engine comprising, in the preferred embodiment, a Mercedes Benz M112 engine. An engine control unit is designated generally 20 and controls an engine designated generally 22. The engine includes six cylinders designated generally 24. Each cylinder includes a pressure sensor 26 which connects to the ECU via a line 28. In addition the ECU provides electronic control to each of the cylinder spark plugs (not shown) via control lines 30. The ECU 20 can also receive additional controls and actuator inputs 32 as discussed in more detail below. The engine management system monitors the pressure in each cylinder through each complete engine cycle, namely 720° rotation of the crankshaft in a four-stroke engine. Based on this data the spark timing for each cylinder 24 is varied by varying the timing of each spark plug via control lines 30.

Figure 3:
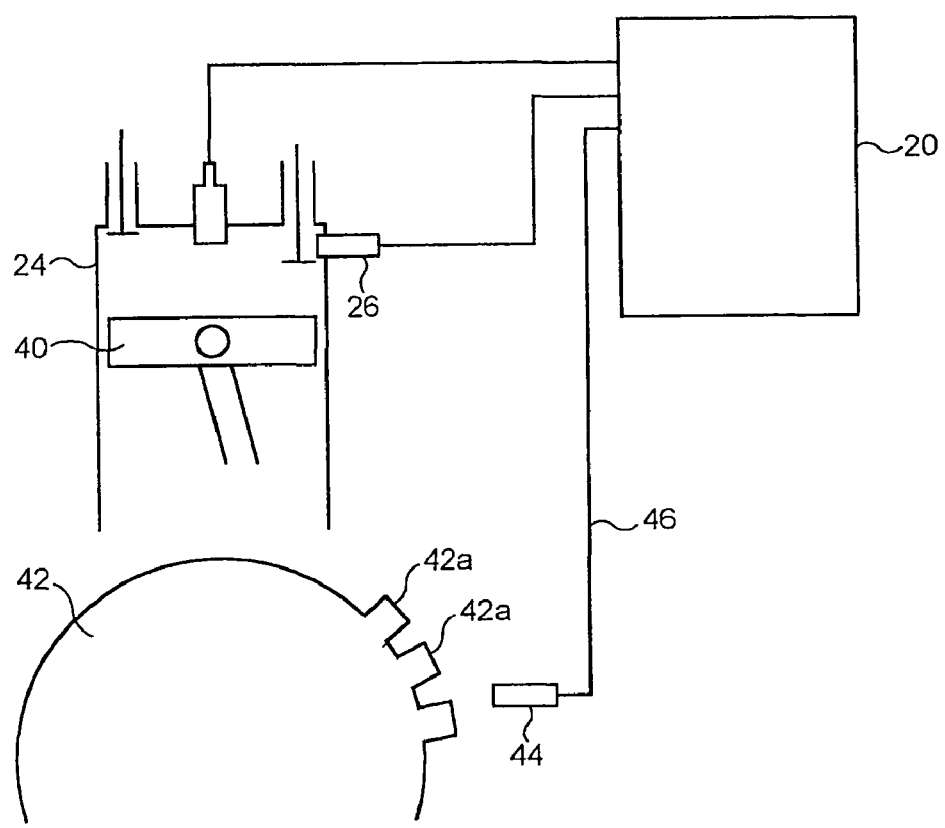
FIG. 3 is a schematic view of a single cylinder in cross-section according to the present invention.

In FIG. 3 there is shown schematically a more detailed view of a single cylinder 24 of the engine. The in-cylinder pressure sensor 26 comprises a piezoresistive combustion pressure sensor with a chip made of silicon on insulator (SOI) available from KistlerInstrumente AG, Winterthur, Switzerland as transducer Z17619, cable 4767A2/5/10 and amplifier Z18150. It will be appreciated that any appropriate in-cylinder pressure sensor can be used, however. For example the sensor can be of the type described in co-pending application number DE 100 34 390.2. The pressure sensor 26 takes repeated readings through the four strokes at the piston 40. The readings are crank-synchronous and triggered by crank teeth 42a of the crank 42, detected by a crank tooth sensor 44 which sends an appropriate signal via line 46 to the ECU 20. In the preferred embodiment readings are taken every 2° of crankshaft rotation although any desired resolution can be adopted, the limiting factors being processing power and crank angle sensing resolution. For each cylinder the readings are taken across a cycle window of width 720°. As discussed in more detail below with reference to FIG. 18, the window is selected to run from a point shortly before engine top dead centre (TDC) for each cylinder.

In operation the system can adopt various states or modes. They include engine power-up, engine start-up (that is, before steady state condition is reached), and in the steady state condition, idle speed when the engine is idling and, when the throttle is applied, fuel efficiency mode (FEM) and smooth running mode (SRM). SRM is entered when steady state is detected but the system preferably switches to FEM during transient manoeuvres in order to maximise engine response as the FEM state corresponds to maximum torque for a given amount of fuelling. During a transient manoeuvre a fast responding engine is more important than a smooth running one. As discussed below the pressure data obtained as discussed above can be used to enhance various of these states. In addition the data can be used to identify engine knocking and misfire which can also be considered as system states although these are local to each cylinder.

The manner in which the pressure data is used will now be described in detail in relation to two possible modes, FEM and SRM. In either case sufficient data is collected to construct a pressure variation function effectively corresponding to plotting a pressure curve against appropriate values from the data points obtained. As a result, derivations based on assumptions and predetermined relations or parameter values are minimised.

Fuel Efficiency Mode

In fuel efficiency mode, the spark timing of each individual cylinder is controlled based on the pressure sensor readings from the previous cycle window to maximise the torque produced by the cylinder. It is known that there is an optimum crank angle (CA) position $\theta_{50ideal}$ at which 50% of the fuel in the cylinder is burnt for maximum torque to be achieved. The pressure sensor readings are processed as discussed below to establish the actual CA $\theta_{50real}$ at which 50% of the fuel is burnt. This value is then compared against the known optimum value using a look-up table and the spark timing for the cylinder is advanced or retarded as appropriate in a closed loop to bring the actual value closer to the optimum value. The contents of the look-up table are derivable or calibratable in a manner that will be well known to the skilled person. As a result the spark timing is controlled for each cylinder to near minimum advance for best torque (MBT). Separate control of cylinders enables near MBT timing to be achieved irrespective of engine production variations, in-service wear, changes in humidity or fuel types. The relatively large number of pressure data gathered during each cycle enables signal averaging for greater noise immunity. It will be appreciated, of course, that any other proportion of fuel burnt can be used to obtain a target crank value and the proportion of 50% is selected purely because of the amount of data available for that proportion.

Figure 4A:
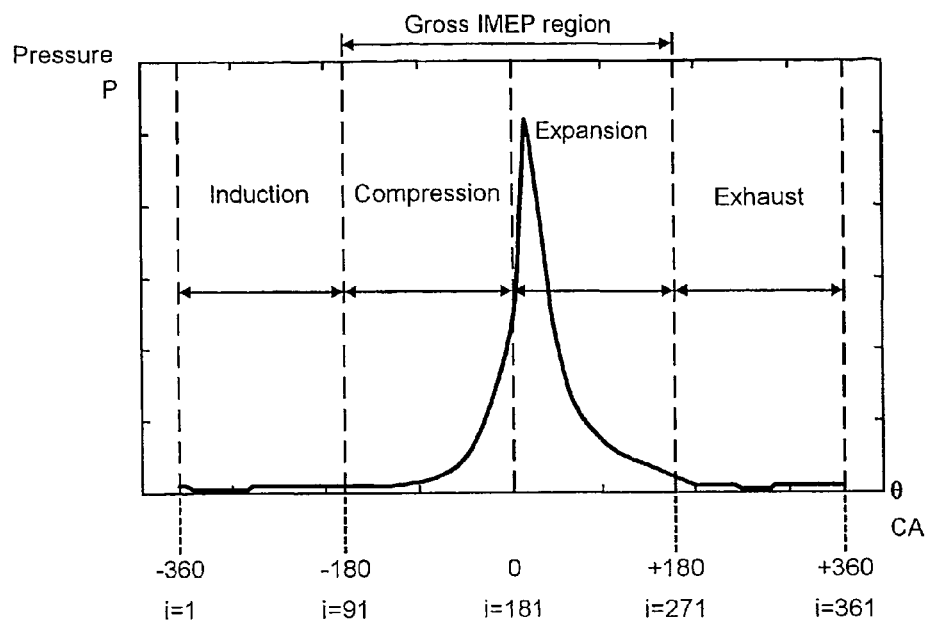
FIG. 4a is a trace of pressure against crank angle for a cylinder cycle of a four-stroke engine.
Figure 4B:
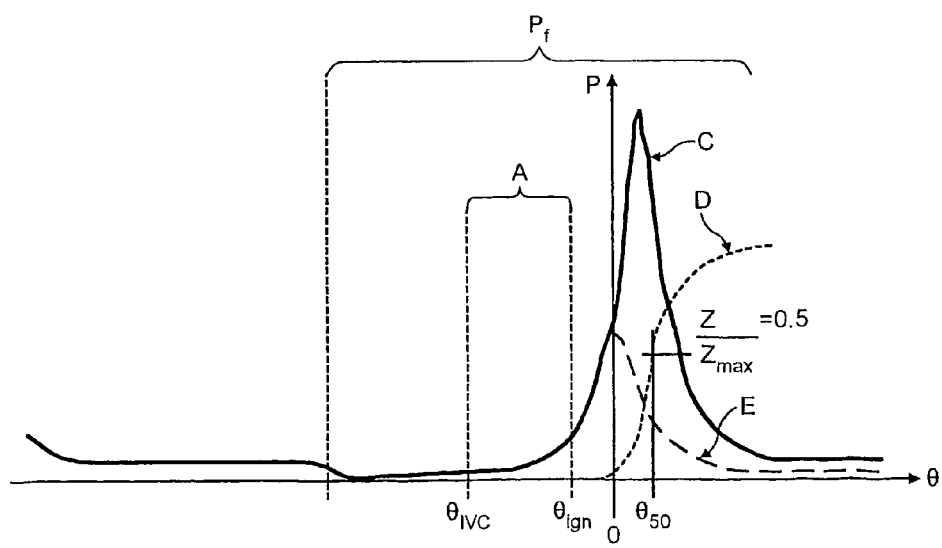

FIGS. 4a and 4b illustrate how the CA position at which 50% of the fuel is burnt $\theta_{50real}$ is estimated directly from the cylinder pressure signal. This is carried out for each cylinder during the compression stroke of every cycle.

FIG. 4a shows the cylinder pressure variation against crank angle for one full cycle between −360° and +360°. As is well known the engine cycle is divided into four regions, induction from −360° to −180°, compression from −180° to 0° (TDC), expansion from 0° to +180° and exhaust from +180° to 360°, defining a full 720° cycle. Theoretically, for instantaneous combustion occurring over an infinitely small period of time the optimum point for firing the spark is at 0° TDC, but in practice the spark timing can vary by −44 to +5° from TDC while $\theta_{50real}$ can vary by +5° to +25° from TDC dependent upon instantaneous conditions. By estimating the empirical value $\theta_{50real}$, the ideal CA $\theta_{50ideal}$ and hence the actual optimum spark firing angle can be tracked.

FIG. 4b shows the cylinder pressure against CA plot once again with additional data points shown. The cylinder pressure curve C is derived from the filtered pressure signal $P_f$ obtained by passing the raw digital pressure signal values through a zero phase-shift low pass filter to attenuate signal noise.

Medium and long-term sensor drift is then compensated for by applying the polytropic gas principle, applying the law:

$$(P_f + P_0)V^n = \text{constant} \quad (1)$$

where: $P_0$ = offset pressure
$P_f$ = filtered pressure signal
$V$ = cylinder volume
$n$ = polytropic index To derive the offset pressure $P_0$ three values of $P_{fj,k,l}$ are selected together with the corresponding cylinder volumes $V_{j,k,l}$ at each of those points (which can of course be derived directly from the crank angle value). It can be shown that the equation can be solved neatly if the values are chosen at points for which the respective values of volume satisfy the equation:

$$V_k = \sqrt{V_j V_l} \quad (2)$$

The subscripts j, k, l, represent the respective data points corresponding to CA positions $\theta_j$, $\theta_k$ and $\theta_l$. It can be shown that, in this case, equation (1) yields the relationship $$P_o = \frac{P_{fk}^2 - P_{fj} P_{fl}}{P_{fj} + P_{fl} - 2P_{fk}} \quad (3)$$

As a result $P_o$ can be obtained effectively estimating n at every cycle for each cylinder, compensating for variation of n with engine temperature, exhaust re-circulation and so forth.

Having obtained the value of the offset pressure and hence compensated for any sensor drift, the adjusted cylinder pressure values are used to derive $\theta_{50real}$. The derivation is based on the known relationship between the combustion pressure, the "motoring pressure" and the proportion of fuel burnt in the cylinder, herein called "pressure ratio control". The motoring pressure is the cylinder pressure that would result from no combustion taking place and is represented by curve E in FIG. 4b. Of course once the fuel is ignited in the cylinder at $\theta_{ign}$ the curve C is no longer representative of the motoring pressure. Accordingly, as discussed below, the motoring pressure subsequent to $\theta_{ign}$ is extrapolated as shown by the dotted part of curve E.

Under motoring conditions the behaviour of the gases in the cylinder can be modelled as a continuous polytropic process during both compression and exhaust strokes such that the gas law of equation (1) can be reapplied as:

$$P_c V^n = K \quad (4)$$

Where $P_c$ is the cylinder pressure corrected for drift, given by:

$$P_c = P + P_o \quad (5)$$

and K is the polytropic constant.

$P_c$ is obtained directly from the raw signal P rather than the filtered signal $P_f$ in this case. This is because, as discussed below, the subsequent processing steps including a least squares fit over a number of data points which is more accurate when applied to the raw data and filters out distortion from the low-pass filter in any event.

The portion A of the curve C from which the motoring pressure curve E is derived extends between the point $\theta_{IVC}$ at which the intake valve to the cylinder closes (intake value closure) and the value of $\theta_{ign}$ which in a preferred embodiment can vary from cycle to cycle to allow better estimation of the motoring pressure curve under heavily retarded conditions. Alternatively, however $\theta_{ign}$ can be limited to the most advanced possible spark timing. Accordingly data values $P_i$ and $V_i$ are taken across the range $i_{ivc} < i < i_{ign}$. By taking logarithms on both sides of the polytropic gas equation, a least-squares curve fitting technique is applied over the range of pressures during the compression stroke, to yield the constants n and K. This enables the rest of the motoring pressure $P_m$ curve E to be constructed from the values of each measurement point i:

$$P_{mi} = V_i^{-n} K \quad (6)$$

Alternatively the system could use iterative techniques to estimate $P_o$, n and K together but the preferred embodiment is the curve fitting technique described above as it is found to reduce the processing time necessary.

Having derived the motoring pressure curve E, $\theta_{50real}$ is obtained from an estimate of the proportion of fuel burned in each cylinder, the so-called fuel mass fraction burnt (MFB). At a given data point i this proportion $Z_{MFBi}$ is given by:

$$Z_{MFBi} = \frac{P_{fci}}{P_{mi}} - 1 \quad (7)$$

where $P_{fc}$ is the filtered cylinder pressure corrected for drift. The subtraction of 1 takes into account the relationship $$\frac{P_{fc}}{P_m} \geq 1$$

i.e. the filtered pressure resulting from combustion will never be less than the motoring pressure under normal operating conditions. The data point $i_{50}$ approximating to 50% MFB is obtained thus:

$$Z_{MFBi50} \approx \frac{Z_{max}}{2} \quad (8)$$

$Z_{max}$ is the maximum value of $Z_{MFB}$, as represented by curve D in FIG. 4b. Because the data points are discrete data points with a resolution in the present embodiment of 2°, a value of $\theta_{50real}$ can be interpolated between adjacent data points by a straight line iteration relying on the linear relationship between the data points and the crank angle.

Figure 5:
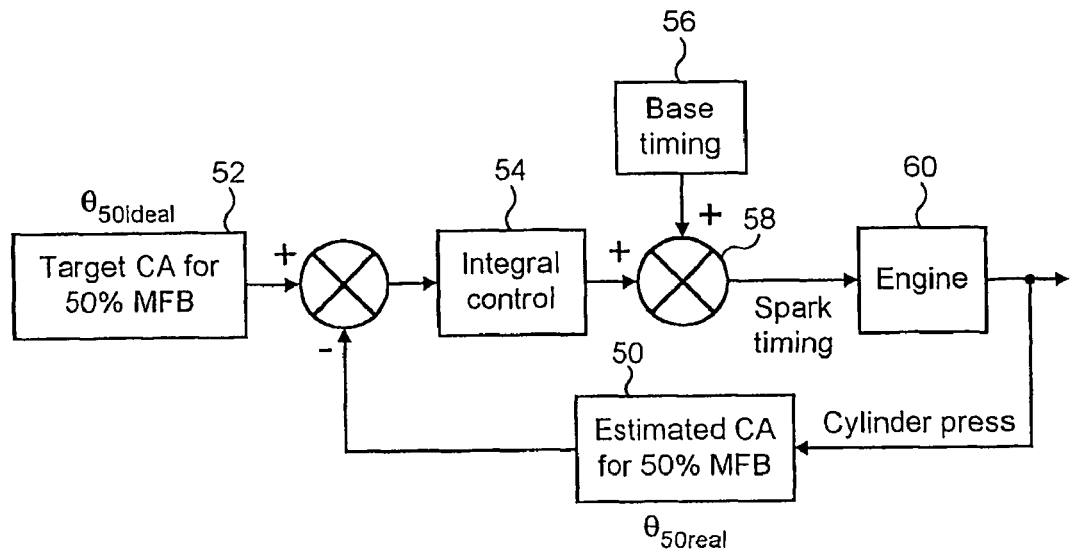
FIG. 5 is a block diagram showing integral feedback control for fuel efficiency mode according to the present invention.

The value $\theta_{50real}$ derived from a given cycle window is applied to the spark timing control for the next cycle to approach the target value $\theta_{50ideal}$ as shown in FIG. 5 using integral feedback control. Integral control action trims the base spark timing to approach $\theta_{50ideal}$. This is made possible by reducing the error between $\theta_{50ideal}$ and the estimated value $\theta_{50real}$. This base spark timing is obtained from a 2-D look-up table against engine speed and load. By using integral control action and designing the control gains appropriately fast tracking of $\theta_{50ideal}$ can be obtained.

Referring to FIG. 5 in more detail, for each cycle window the algorithms described above are carried out based on the cylinder pressure sensor data to provide an estimate of $\theta_{50real}$ at block 50. For the instantaneous engine conditions a value of $\theta_{50ideal}$ is derived from a look-up table at block 52 and these values are compared at integral control 54. The engine base timing 56 is trimmed at 58 and the cylinder is fired at 60. The pressure data for this cycle is monitored to obtain the next value of $\theta_{50real}$ and the process is repeated for each subsequent cycle.

Figure 6:
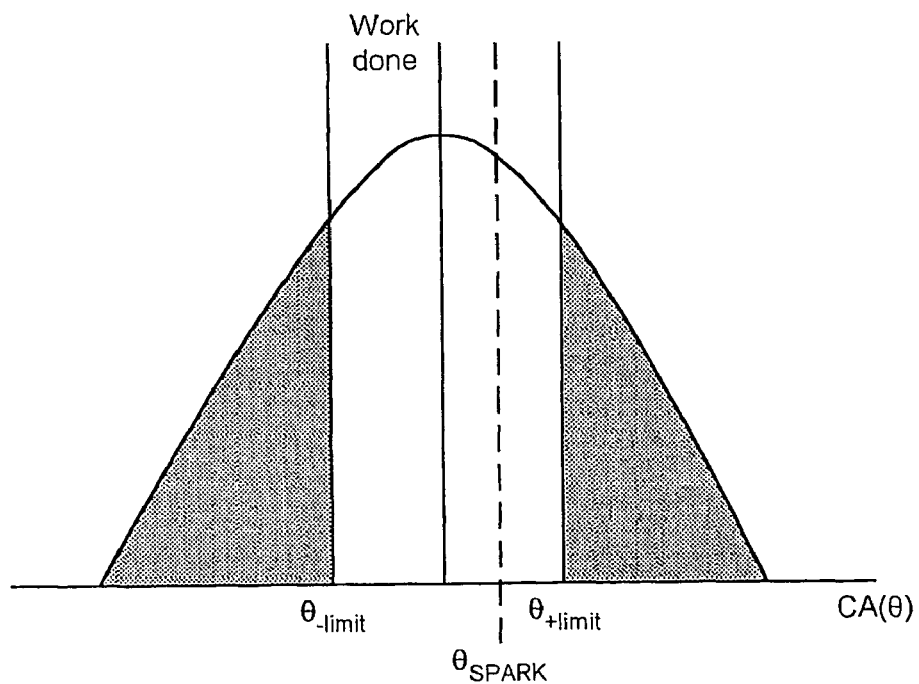
FIG. 6 is a trace showing variation in work done against spark timing angle.

At shown in FIG. 6 the integral action is suspended when the spark timing angle $\theta_{SPARK}$ falls outside a set of pre-defined limits $\theta_{-limit}$, $\theta_{+limit}$. These limits represent the maximum and minimum permissible spark timing angles and in practice are obtained from 2-D look-up tables. When the spark timing moves back within these limits resulting from a change in engine conditions, integral action re-commences. As shown in FIG. 6, the limit values are selected based on a threshold value for the efficiency of the engine in terms of work done. When the spark timing moves back within these limits resulting from a change in engine conditions, integral action re-commences. This avoids so-called integral wind-up.

By carrying out this system for the compression stroke of every cycle of every cylinder, fuel efficiency mode is obtained by ensuring that each cylinder operates at near MBT timing based only on instantaneous engine conditions. In addition, because the motoring pressure is extrapolated from optimised performance data for each cycle, there is no need to alter the operation of the cylinder in order to derive motoring pressure, for example by retarding the spark timing.

Smooth Running Mode

Smooth running mode involves balancing the average torque delivered by the cylinders under steady-state conditions. To do this, a measure of the work done on the piston for each engine cycle of each cylinder is obtained based once again on the sensed in-cylinder pressure data. The "weakest" cylinder is identified, and operating this cylinder to near MBT as discussed above in relation to fuel efficiency mode, the timing on the other cylinders is retarded to match the work done by the weakest cylinder again using closed loop techniques.

Figure 7:
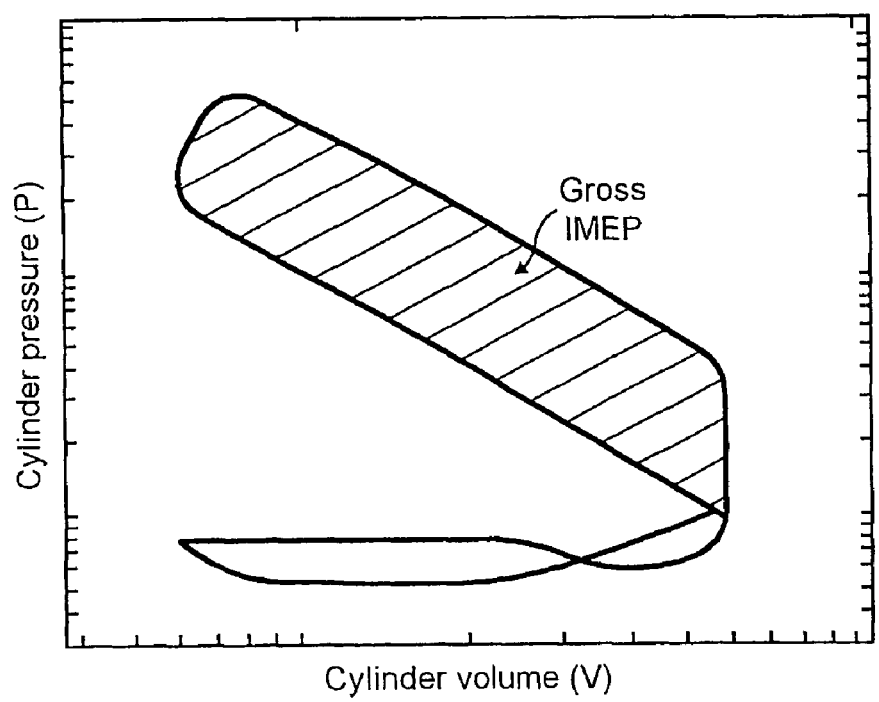
FIG. 7 is a trace showing Indicated Mean Effective Pressure (IMEP) for a cylinder cycle.

The work done by the gases on the piston for each engine cycle can be represented by the IMEP over the engine cycle as represented in FIG. 7 which shows a plot of cylinder pressure, P against volume V over a single four-stroke cycle. The area shown shaded is the gross IMEP relating to the work done during the compression and expansion strokes while the area enclosed by the entirety of the plot is the net IMEP relating to the work done over the whole cycle, including work done on the gases by the piston during the induction and exhaust strokes. The gross IMEP region is also shown on the pressure versus crank angle plot of FIG. 4a.

Because the samples taken are sufficient to plot the Pressure/Volume curve the IMEP can be obtained empirically by applying trapezoidal integration yielding, for the net IMEP:

$$IMEP_{net} = \frac{1}{V_s} \sum_{i=1}^{m-1} \frac{P_i + P_{i+1}}{2} (V_{i+1} - V_i) \quad m = \frac{720}{\theta_{res}} \quad (9)$$

Equation (9) is preferably calculated based on the raw pressure data as the effects of noise are reduced because the IMEP is effectively obtained by integration. Similarly the pressure off-set correction is irrelevant to the IMEP calculation since it is a cycle integral of the area enclosed the PV diagram of FIG. 7 and so it is independent of absolute pressure values.

Figure 8A:
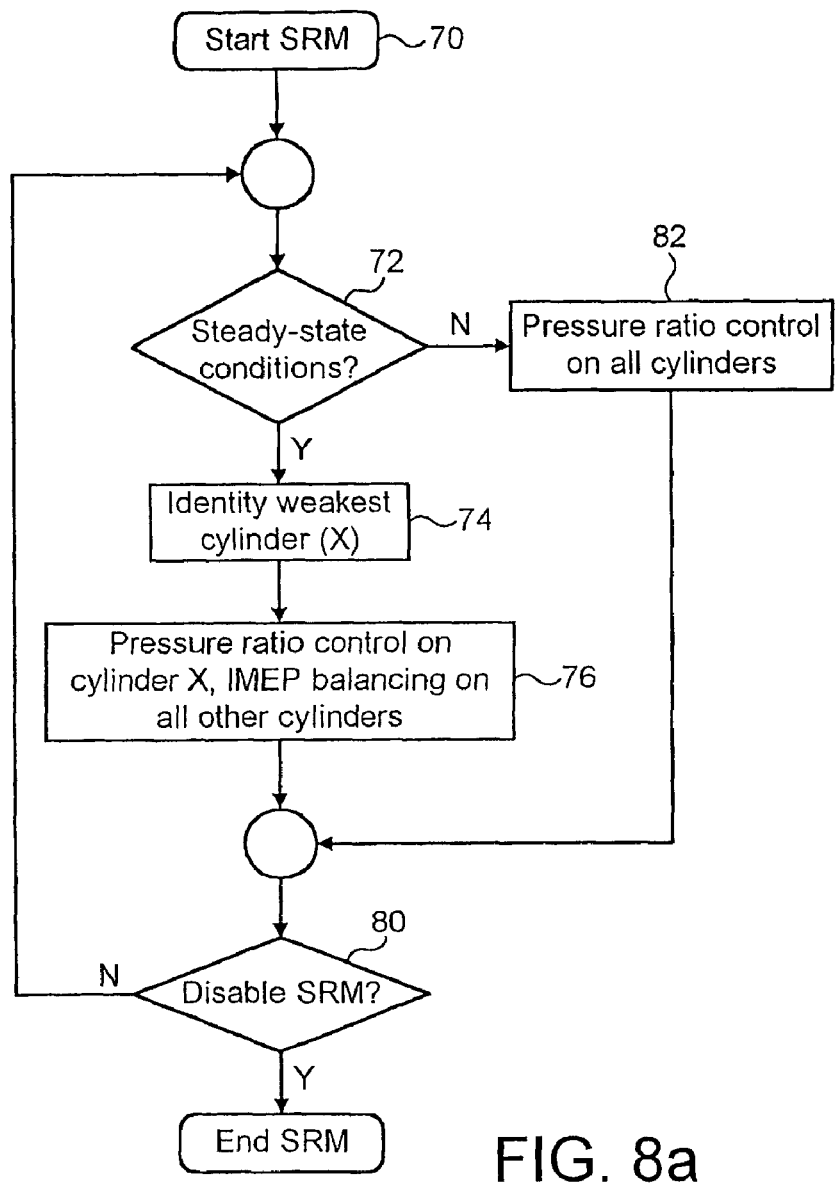
FIG. 8a is a flow diagram illustrating engine control in smooth running mode according to the present invention.

FIG. 8a illustrates engine control in the smooth running mode in which the cylinder IMEP's are balanced to achieve a smooth running engine. Smooth running mode starts at step 70 and at step 72 the engine is checked for steady-state conditions as discussed in more detail below. If steady state conditions are detected then at step 74 the weakest cylinder is identified by comparing the filtered mean (moving average) IMEP's of all cylinders near MBT as discussed below with reference to FIG. 8b. The cylinder with the least mean IMEP is identified as the weakest and the target IMEP for cylinder balancing at step 76 is based on the IMEP of that cylinder. The weakest cylinder is continually updated by comparing IMEP's of cylinders which are running within a given window of MBT. Introducing a window of MBT prevents a run-away condition in which a cylinder over-shoots the target IMEP in the subsequent cycle, becoming the weakest cylinder in the next cycle and establishing a target IMEP which is yet again overshot in the succeeding cycle. By limiting the crank angle range over which the spark can be fired (and hence defining a window of MBT) this condition is avoided.

In the case of run-away, SRM is disabled at step 80. Otherwise the system loops back to step 72 once again. In the case that at step 72 steady state conditions are not detected then at step 82 pressure ratio control (as discussed with reference to FIG. 5) is instituted on all cylinders so that fuel efficiency mode is effectively re-entered. As a result, the system automatically switches to FEM during transient manoeuvres, maximising engine response by providing maximum torque for a given amount of fuelling which is more important than a smooth running engine during such manoeuvres.

SRM can also be disabled when certain engine conditions are detected. For example over a certain engine speed, say, 3000 RPM, external factors such as flex in the crankshaft render IMEP a less relevant indicator for smooth running mode. Accordingly step 72 may include the additional sub-steps of comparing engine conditions such as engine speed against values obtained from a look-up table to establish whether the conditions for disabling SRM are met.

To detect steady-state engine conditions at step 72, the cycle to cycle variations of IMEP for each cylinder are monitored. It is preferable to carry out the exercise on each cylinder as, in addition to common parameters such as engine load and engine speed, variations may arise between cylinders because of differences in their physical dimensions, non-symmetrical manifold geometry, build up of deposits and so forth. In addition to parameters such as engine load and speed, small variations arise due to the differences in heat release from cycle to cycle. This is caused by the random mixing of air, fuel and recirculated exhaust gas.

The variance of the net IMEP for each cylinder is updated for cycle j as follows:

$$\text{var}(IMEP_{net})_j = \beta \text{var}(IMEP_{net})_{j-1} + (1-\beta)[IMEP_{net\ j} - \text{mean}(IMEP_{net})_j]^2 \quad (10)$$

In equation (10) $\beta$ is the forgetting factor (typically 0.9 to 0.99) and mean ($IMEP_{net}$) is the mean IMEP. This mean is updated using a moving average filter:

$$\text{mean}(IMEP_{net})_j = \beta \text{mean}(IMEP_{net})_{j-1} + (1-\beta) IMEP_{net\ j} \quad (11)$$

Accordingly the mean ($IMEP_{net}$) factor smoothes out major fluctuations in instantaneous $IMEP_{net}$ values dependent on the size of the forgetting factor. The variance is similarly smoothed in equation (10) by combining the variance of the previous data value with a fraction of the variance of the current value from the mean, the level of smoothing again being dependent on the value selected for the forgetting factor β.

As equations (10) and (11) are iterative it will be recognised that start-up values are required to begin the iteration, both for variance and mean of IMEP. In a production application, this would correspond to values at idle speed when the engine is started such that typical values could be applied as the initial values, both values being specified during engine calibration. Accordingly those values would be set for all engines corresponding to the calibrated engine which can give rise to problems in practice as those values may vary widely as a result of changes in environmental conditions, production build variations and so forth.

In a preferred embodiment, however, the present invention takes account of possible inaccuracies in calibrated initiation values. In particular, over the initial cycles, β is initially set to zero for the first cycle and increased exponentially to converge on a typical value $\beta_{final}$ between 0.9 and 0.99. Over those initial cycles a value of β is inserted into equation (10) and (11) according to the following algorithm:

$$\beta_j = \alpha\beta_{j-1} + (1-\alpha)\beta_{final} \qquad (11a)$$

Where j is the cycle number starting from 1, α is a predetermined time constant (typically 0.8 to 0.9) and $\beta_0=0$. Inserting the initial value of β=0 into equation (10) and (11) cancels out terms dependent on an initialisation value. As β increases for subsequent iterations, therefore, the variants and mean values quickly settle to representative values. This is because as β approaches $\beta_{final}$ as governed by equation (11a) the preceding values of var ($IMEP_{net}$) and mean ($IMEP_{net}$) quickly increase in significance.

When all the variances of cylinder IMEP's fall below a given threshold, the steady-state condition is flagged. Conversely when one or more of the cylinder variances rises above this threshold, the steady-state condition is disabled and the system moves to box 82 as shown in FIG. 8a where pressure ratio control is exercised in the cylinders.

Figure 8B:
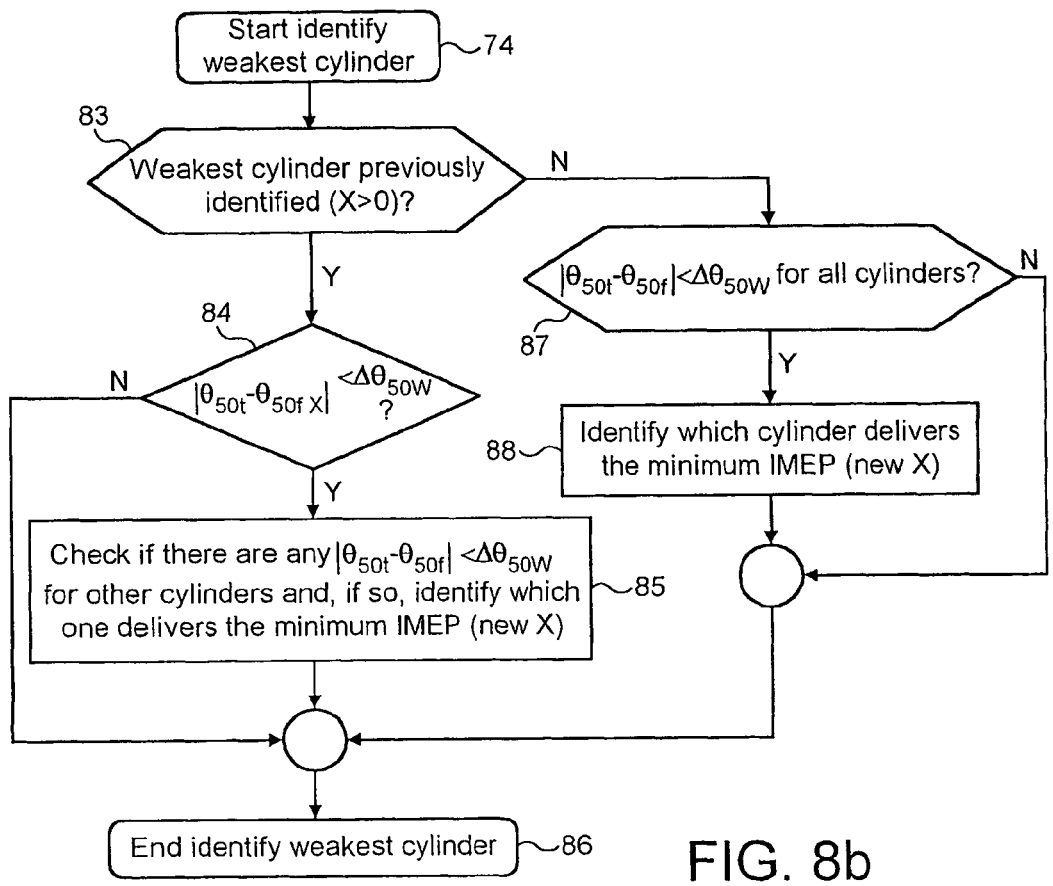
FIG. 8b is a flow diagram showing how the weakest cylinder is identified in smooth running mode according to the present invention.

FIG. 8b shows in more detail how the weakest cylinder is identified, where another routine is started at step 74. The weakest cylinder is denoted by X where, for a 6 cylinder engine, X=1, 2, 3, 4, 5 or 6. At step 83 the system checks whether a weakest cylinder has been identified previously by checking the value of X. If X>0, indicating that it has, then the current weakest cylinder is identified by comparing the filtered (moving average) IMEPs of all cylinders within a narrow window of MBT. The cylinder with the least filtered IMEP is identified as the weakest. The target IMEP for cylinder balancing of all cylinders is based on the IMEP of this cylinder. At step 84 cylinder X, is detected as remaining within the narrow window of MBT when:

$$|\theta_{50t}-\theta_{50\,fX}|<\Delta\theta_{50w}$$

where $\theta_{50t}$ and $\theta_{50\,fX}$ are the target and filtered estimated (for cylinder X) 50% MFB CA, and $\Delta\theta_{50w}$ is the CA window. This serves as the threshold below which the Pressure Ratio Controller has convergence i.e. the cylinder is firing at near MBT as controlled by the Pressure Ratio Controller. If convergence has taken place the weakest cylinder is updated at step 85 by comparing IMEPs of cylinders which are running within this window. This ensures that cylinders which are delivering a low IMEP, because their timing is balanced away from MBT, are not mistaken for the weakest cylinder. The value of X is set to the weakest cylinder number at step 85, and the sub routine ends at step 86. If no weakest cylinder has been identified previously at step 83 then if at step 87 all cylinder CAs, $|\theta_{50t}-\theta_{50fX}|$, fall within $\Delta\theta_{50w}$, the weakest cylinder is identified at step 88. Otherwise the routine concludes at step 86.

Figure 9:
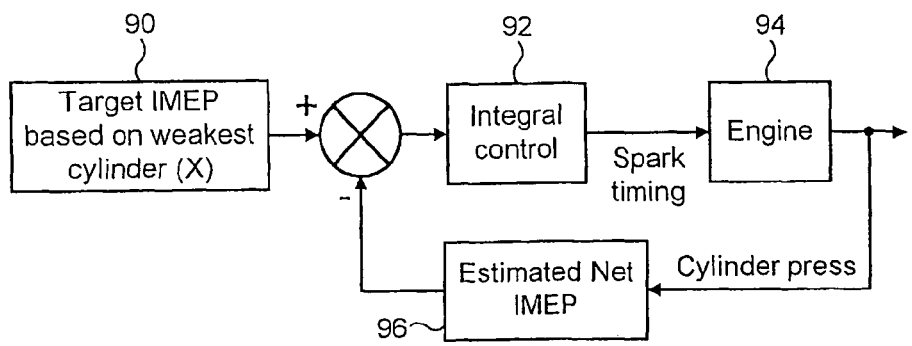
FIG. 9 is a block diagram showing integral feedback control to adjust spark timing angles for IMEP balancing.

FIG. 9 illustrates the use of integral feedback control to adjust the spark timings of each cylinder—typically by retarding that timing—such that its respective IMEP matches the target IMEP of the weakest cylinder (X). At block 90 the target IMEP is identified as at step 74 of FIG. 8a. At integral control block 92 the spark timing to the engine 94 is adjusted so that the IMEP of the respective cylinder matches the target IMEP. The net IMEP for the current cycle and cylinder is estimated at block 96 based on the cylinder pressure as discussed above and the weakest cylinder identification step 74 shown in FIG. 8 is repeated.

Figure 10:
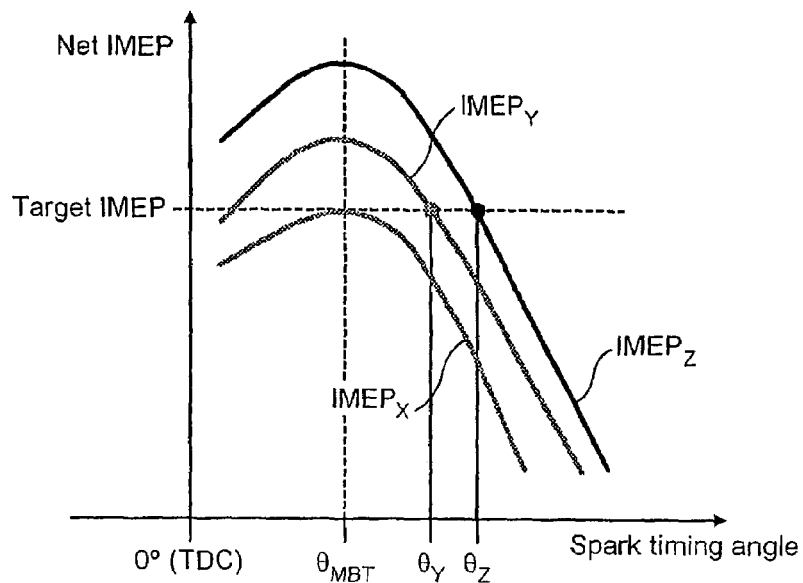
FIG. 10 is a plot showing variation of spark timing angle with net IMEP.

Referring to FIG. 10 it can be seen how the spark timings are retarded by examining the plot of net IMEP against spark timing angle for the weakest cylinder $IMEP_X$ and two other exemplary cylinders displaying $IMEP_Y$ and $IMEP_Z$. In particular once $\theta_{MBT}$ is identified for $IMEP_X$, the retarded timings $\theta_Y$ and $\theta_Z$ for respective cylinders Y and Z are obtained by extracting the spark timing angle for each respective IMEP curve corresponding to the peak $IMEP_X$ value. It will be appreciated that FIG. 10 merely illustrates the principle of IMEP balancing—in practice the integral feed-back control technique described in relation to FIG. 9 is applied to track the target IMEP.

The pressure data obtained can also be applied to detect or enhance other engine states including engine misfire, engine knock and start-up control.

Misfire Detection

In either mode the invention further provides for misfire detection based on the sensed in-cylinder pressure values. This is done once again by monitoring the IMEP and comparing it against a threshold value. Referring once again to FIG. 7 the net IMEP is the total area of the cylinder pressure versus cylinder volume in the plot shown. In order to detect misfire, the invention determines only the gross IMEP as indicated on FIG. 7 corresponding to the work done during the compression and expansion strokes. Gross IMEP represents the real work done by the combustion since it excludes the work done in pumping the air and exhaust during the induction and exhaust strokes. Advantageously the invention allows measurements of gross IMEP although net IMEP is conventionally easier to measure. For a crank angle resolution of two degrees, the gross IMEP is given by:

$$IMEP_{gross} = \frac{1}{V_s}\sum_{i=91}^{270}\frac{P_i+P_{i+1}}{2}(V_{i+1}-V_i) \qquad (12)$$

where once again $V_s$ is the cylinder swept volume and $P_i$ and $V_i$ are the measured cylinder pressure and crank based volume. Bearing in mind the crank angle resolution of 2°, the values of i correspond to the crank angle range across the compression and expansion strokes from −180° to +180°. In known systems, misfire detection is alternatively based on detection of exhaust temperature or variations in engine flywheel speed, both of which are, again, indirect and hence less accurate indicators of misfire.

Figure 11:
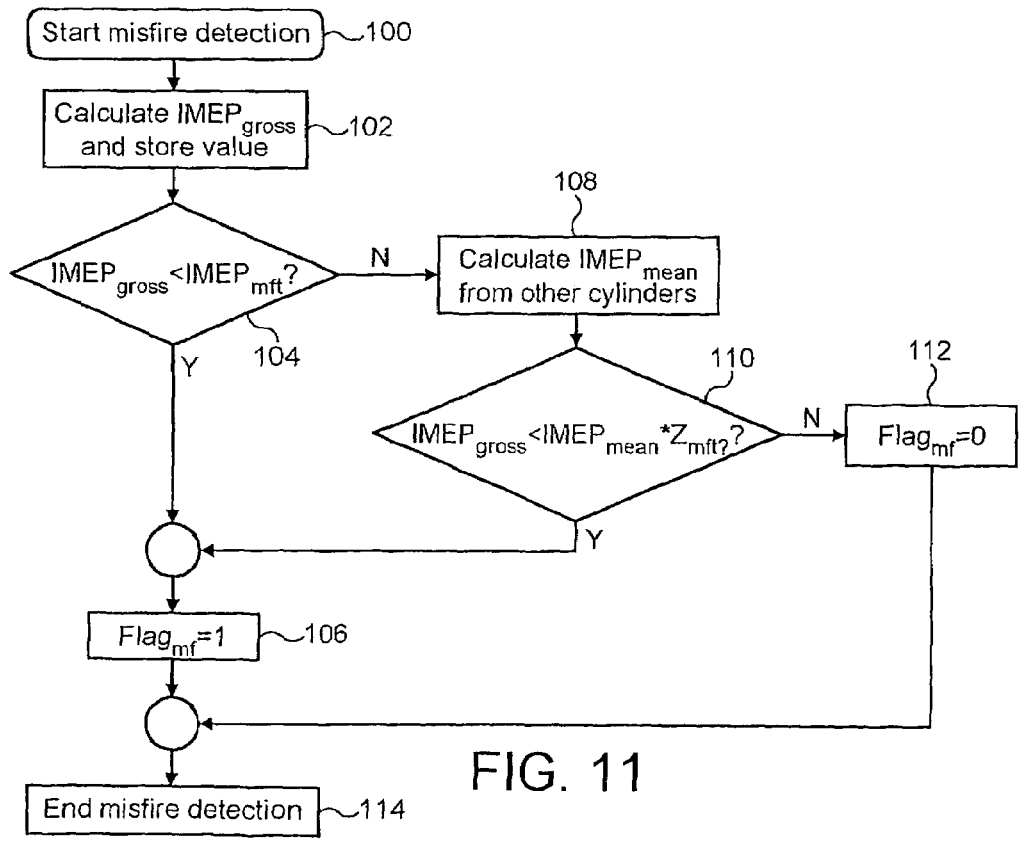
FIG. 11 is a flow diagram showing misfire detection according to the present invention.

Referring now to FIG. 11 the threshold crossing technique used according to the present invention to detect misfire is described. At step 100 the misfire detection algorithm is started and at step 102 the gross IMEP for the cylinder over one cycle window is calculated and a value $IMEP_{gross}$ is stored. At step 104 $IMEP_{gross}$ is compared against an absolute misfire threshold $IMEP_{mft}$. $IMEP_{mft}$ can be derived from a look-up table based on instantaneous engine conditions such as engine speed and engine load. If $IMEP_{gross}$ is less than $IMEP_{mft}$ at step 104, then at step 106 a misfire is flagged and a value $Flag_{mf}$ is set at 1.

If, at step 104, $IMEP_{gross}$ exceeds the absolute threshold value $IMEP_{mft}$ then at step 108 $IMEP_{mean}$ is calculated for the other cylinders in their corresponding cycle windows. At step 110 the value $IMEP_{mean}$ is multiplied by a relative misfire threshold factor $Z_{mft}$ and $IMEP_{gross}$ is compared against $IMEP_{mean}$ multiplied by the relative misfire threshold $Z_{mft}$. If $IMEP_{gross}$ is less than this product, i.e. it is below a certain proportion of the mean IMEP, then again at step 106 the value of $Flag_{mf}$ is set to 1. However if the $IMEP_{gross}$ exceeds the product then at step 112 $Flag_{mf}$ is set to zero. In any event once the $Flag_{mf}$ is set the misfire detection algorithm stops for that cycle at step 114.

The response of the system to misfire is similar both for fuel efficiency mode and smooth running mode. In fuel efficiency mode the response of the pressure ratio algorithm described with reference to FIG. 5 to misfire is to suspend the integral action for the misfired cylinder. The trim applied to the base spark timing angle of the misfired cylinder (see block 56) is therefore set to its value before the occurrence of misfire. In smooth running mode the response of the cylinder balancing algorithm shown in FIG. 8 to misfire is the same as that of the pressure ratio controller in fuel efficiency mode. The integral trim applied to the base spark timing angle of the misfired cylinder is set to its value before the occurrence of misfire (see FIG. 9, step 92). In other words, invalid spark timing values which might be derived from the unrepresentative pressure values during misfire are not taken into account. Instead the timing angle for the misfiring cylinder is effectively reset to the last value for which there was no misfire, providing the further advantage of terminating misfire promptly.

Knock Detection

The pressure sensor system further allows knock control based on individual cylinder knock detection. Knock detection is carried out simply by recognising known characteristics of the pressure sensor signal over a cycle window. Signal filtering can be applied to extract the components of the pressure curve at the knock frequencies of the engine. The size of these components is a measure of knock intensity. Knock is detected when this rises beyond a given threshold. Appropriate techniques will be well known to the skilled person and hence are not described in detail here. In the preferred embodiment the new signal is passed through a bandpass filter to isolate the first knock frequency mode (which can be identified on the test bed or estimated using known techniques). Filtering is carried out over a predefined "knock window" i.e. that part of the cycle over which knock is known to occur. The filtered signal is rectified and the mean taken to obtain the knock intensity. It will be appreciated that additional modes can be isolated as well and/or alternative statistical methods applied to identify the knock intensity. Other techniques such as Fast Fourier Transforms can alternatively be applied, the selection of techniques being largely dependent on the data processing power available. The use of an in-cylinder pressure sensor to detect knock reduces signal corruption by mechanical noise generated by moving parts of the engine.

Figure 12:
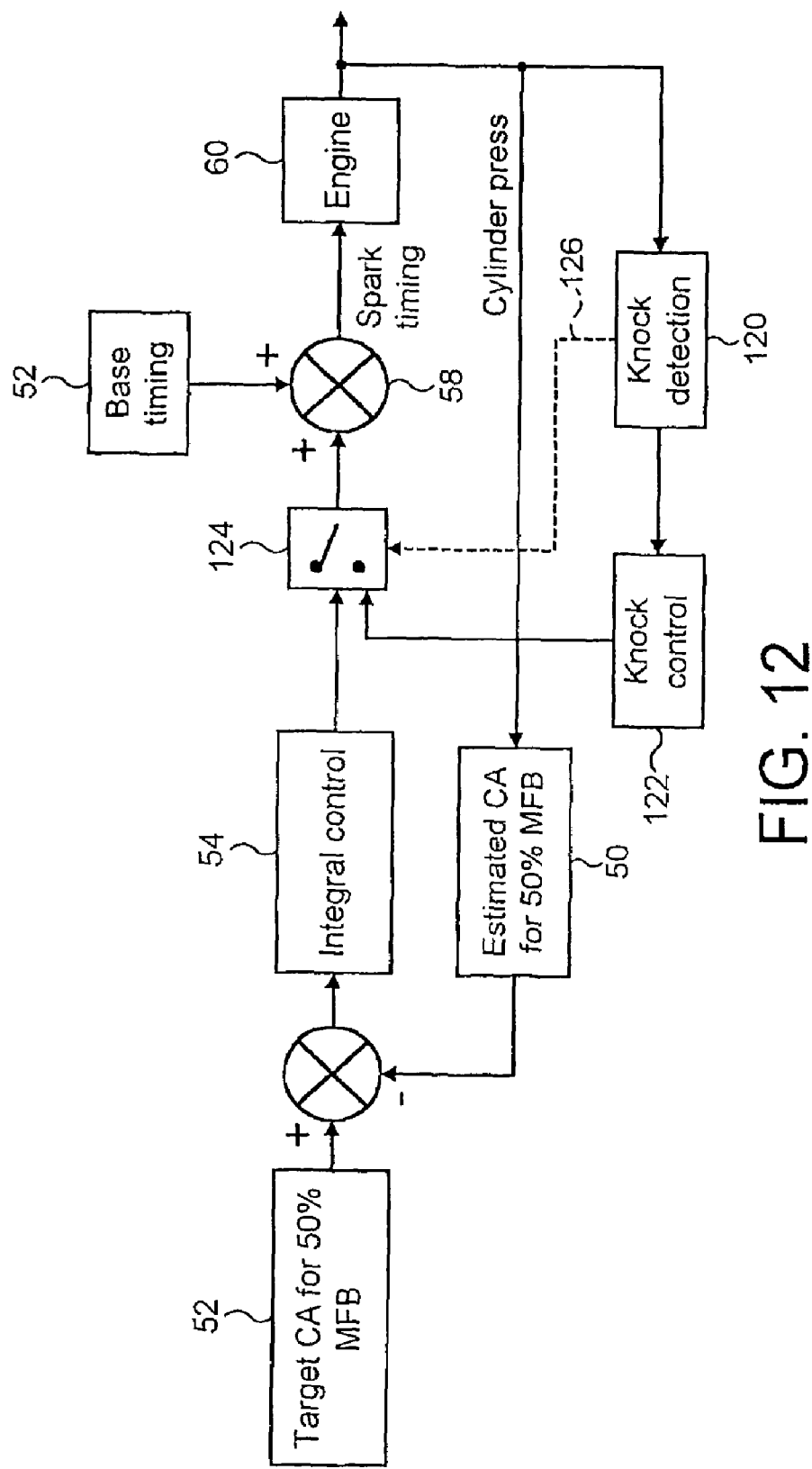
FIG. 12 is a block diagram showing integral feedback control for knock detection.

FIG. 12 shows how the system deals with engine knock in fuel efficiency mode. In particular it will be seen that additional control blocks 120 and 122 together with mode switch block 124 are incorporated with the blocks already discussed above with reference to FIG. 5. The cylinder pressure signal from the engine is sent to knock detection block 120. If knock is detected then knock detection block 120 carries out two steps. First of all it sends a knock detection signal via line 126 to a mode switch block 124. The knock detection signal is also sent to knock control block 122. Mode switch block 124 switches to receive knock control signals from knock control block 122. As a result the integral action is suspended. Engine knock is reduced by immediately retarding the timing for the cylinder in which knock is detected.

Figure 13:
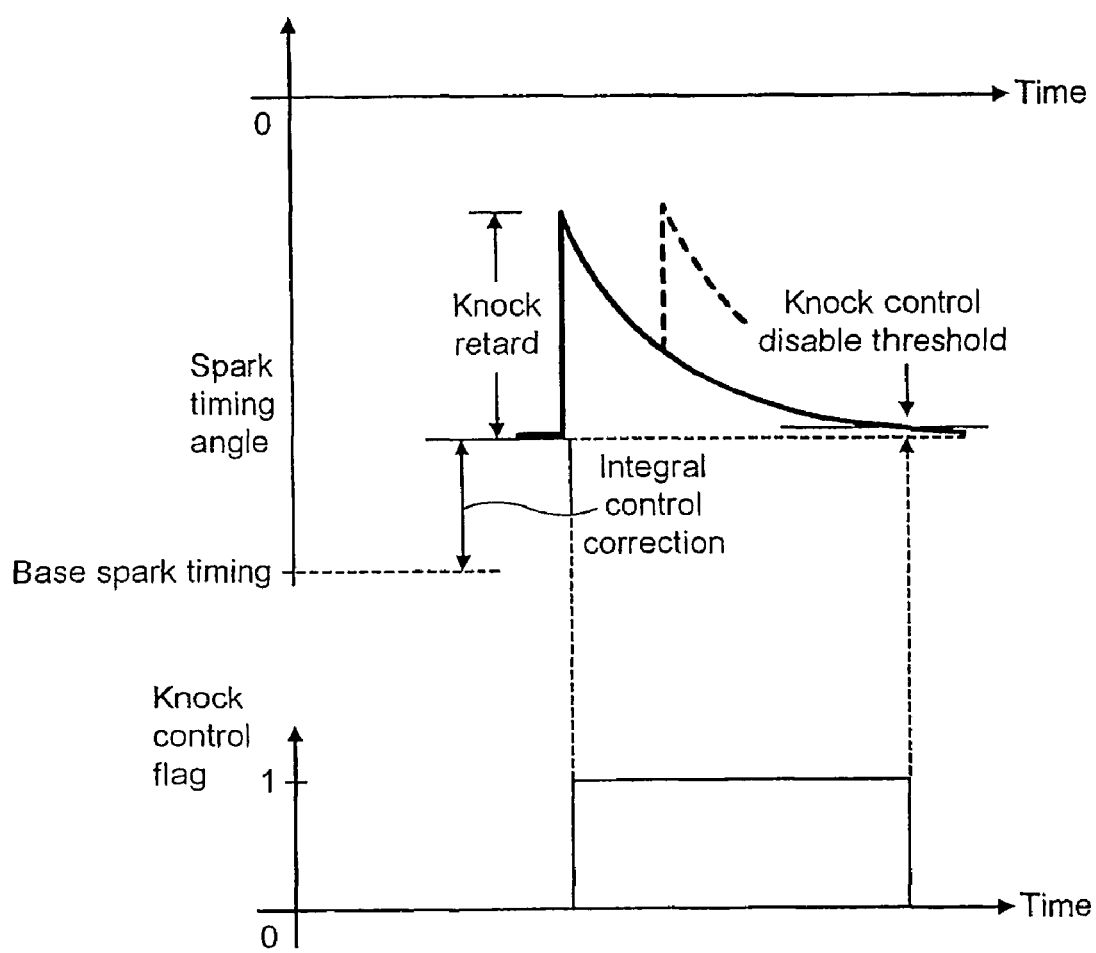
FIG. 13 is a plot showing a spark timing angle retard scheme for knock control as according to the present invention.

The timing is retarded as shown in FIG. 13. The knock control flag is set to 1 (corresponding to a mode switch by switch block 124) upon knock detection by knock detection block 120, as shown in the lower plot of FIG. 13. The spark timing angle is retarded by a predetermined step value. The spark angle is then advanced exponentially until it falls below a knock control disable threshold at which stage integral action is resumed and the mode switch block 124 switches back to integral control. If knock is detected during advancement of the retard angle then the spark timing is immediately retarded to its knock retard value once again as shown in dotted lines in the upper trace of FIG. 13. Once the retard angle has fallen below the threshold the integral state is updated to correspond to the retard angle as it falls below the threshold. As a result a "bumpless" transfer therefore takes place when the mode switch block switches between knock control and integral control as the integral control subsequently seeks the target crank angle $\theta_{50}$ from a starting point of the threshold retard angle.

In smooth running mode, engine knock is controlled similarly to that in the fuel efficiency mode except that all cylinders are retarded by the same angle. This is to ensure a smooth overall engine response to knocking. This common retard angle is based on the maximum knock intensity of all cylinders, that is, the cylinder exhibiting the most knock.

On-line Cylinder Diagnosis

The data obtained by in-cylinder pressure sensing as described in detail above can further be applied for on-line diagnosis of engine/cylinder operation such as fault, leak or failure detection. This can be based on the techniques as discussed above for analysing the PV diagrams obtained from test data. In particular the high crank angle resolution of data acquired over complete engine cycles facilitates on-line cylinder diagnosis. It can of course be applied to any engine in which on-line sensing is taking place, but in the case of a 4 stroke engine various aspects can be detected, for the various strokes. For example on the induction stroke piston ring or exhaust valve leakage can be detected. On the compression stroke, before ignition, piston ring, inlet valve or exhaust valve leakage can be detected. In the exhaust stroke piston ring or inlet valve leakage can be detected.

Detection of the faults can be achieved by using physical models including the polytropic gas relationship (equation (1) above) and, for example, comparison of measured against ideal behaviour in the various parts of the cycle. Alternatively or in addition detection of the faults can be carried out by pattern recognition techniques using, for example, neural networks to identify and develop representative patterns.

Figure 19:
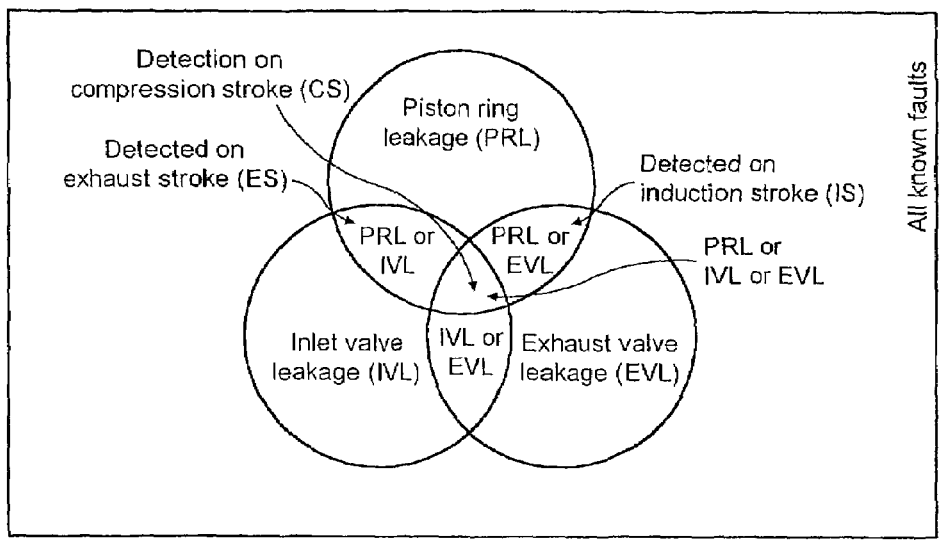
FIG. 19 is a Venn diagram showing on board diagnosis of cylinder leakages.

Furthermore, by cross-correlating the PV results between cylinders, faults in individual cylinders can be recognised by comparison with the others. In particular, by comparing the detection results for each of strokes, the engine management system can diagnose whether the fault is a Piston Ring Leakage (PRL), Inlet Valve Leakage (IVL) or Exhaust Valve Leakage (EVL). This can be clarified by FIG. 19. If Exhaust Stroke (ES) detection is positive and Induction Stroke (IS) detection is negative then the fault is diagnosed as IVL, If ES detection is negative and IS detection is positive then the fault is diagnosed as EVL. If both these are positive then the result is diagnosed as PRL, which can be confirmed by positive Compresson Stroke (CS) detection. This logic can be represented in boolean notation as:

$$IVL=ES \times \overline{IS}$$

$$EVL=\overline{ES} \times IS$$

$$PRL=ES \times IS$$

where 'x' is the AND operator and '‾' denotes NOT.

Also, further system problems common to multiple cylinders can be identified by cross-correlation. For example head gasket leakage may be identified when piston ring leakage is identified from more than one cylinder. Alternatively intake manifold leakage during the induction stroke can be identified again when a common fault is identified across a number of cylinders. This would require an additional ambient pressure sensor and the use of the throttle sensor and intake temperature sensor in order to provide the nominal manifold pressure for comparison purposes.

Using the comparison/pattern recognition techniques discussed above this form of on board diagnostics should be readily distinguishable from sensor failures. It will be appreciated that the approach can be applied to alternative engine forms such as 2 stroke engines, and can be also identified across a full cycle or one or more individual strokes.

Start-up Control

The engine management system further applies automatic compensation on spark timing and air fuel ratio during warm up of the engine in start control mode. It is desirable, in particular, to ensure that the engine warms up as quickly as possible in order that the catalytic converter reaches optimal operating conditions as quickly as possible. To achieve this, the spark timing is retarded, but a limit to the retard angle is the combustion stability limit.

Figure 14A:
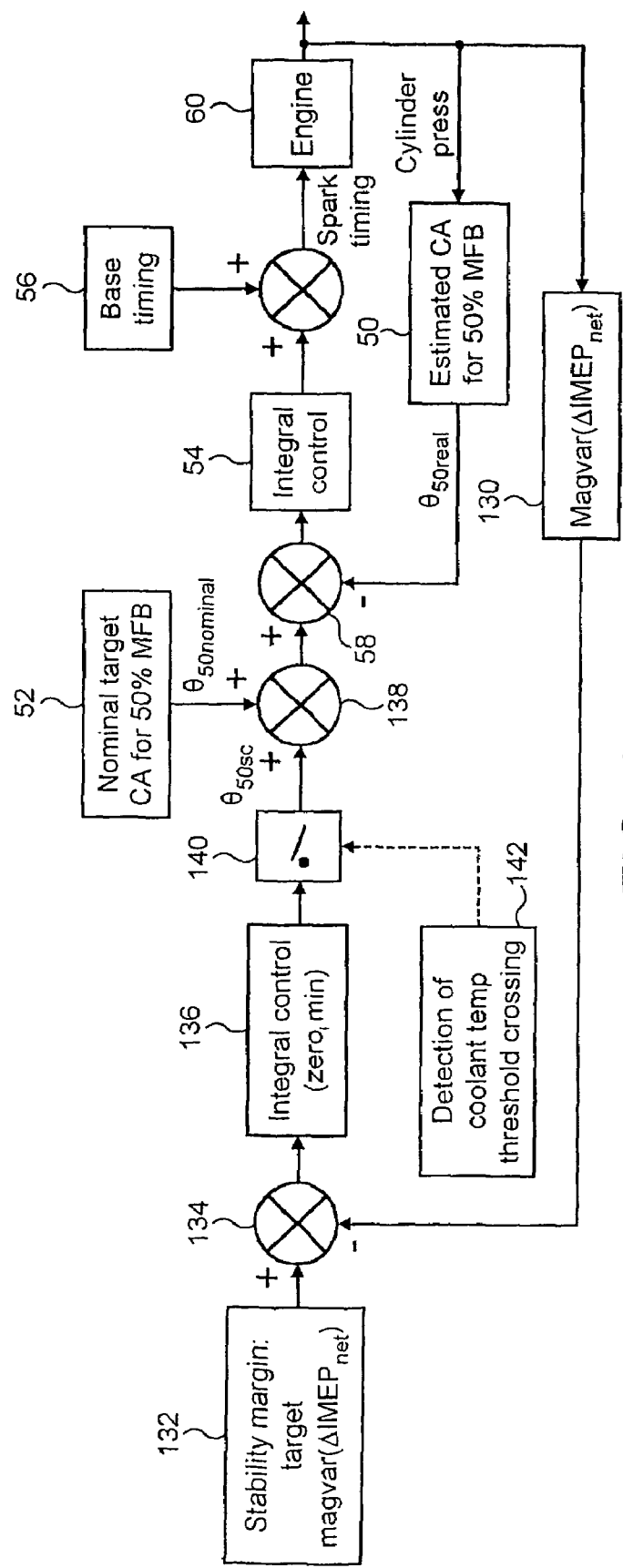
FIG. 14a is a block diagram showing control of spark timing during start up.

FIG. 14a shows an algorithm allowing cycle to cycle monitoring of the combustion stability to allow the spark angle to be retarded as far as possible, based on instantaneous engine conditions, leading to faster warm up. A measure of the combustion stability can be obtained from establishing the variance of $\Delta IMEP_{net}$ that is the variance of the change in $IMEP_{net}$ for each cylinder for successive cycles. Preferably however an alternative indicator of cycle to cycle variability, "magvar" is adopted, defined as:

$$\text{magvar}(IMEP_{net})_j = \beta \text{magvar}(IMEP_{net})_{j-1} + (1-\beta)|IMEP_{net}-\text{mean}(IMEP_{net})_j| \quad (13)$$

This term is preferred as, unlike the formula for variance as set out at equation (10) the second, squared term on the right hand side is avoided making the term magvar less sensitive to the magnitude of the value of IMEP. As a result a better linear relationship between IMEP and the variability function is provided. We replace IMEP in equation (13), with $\Delta IMEP$ represented by:

$$\Delta IMEP_{net\,j} = IMEP_{net\,j} - IMEP_{net\,j-1} \quad (13a)$$

Because $\Delta$ represents a difference, as the number of cycles increases, $\text{mean}(\Delta IMEP_{net})$ tends to 0 giving $$\text{magvar}(\Delta IMEP_{net})_j = \beta \text{magvar}(\Delta IMEP_{net})_{j-1} + (1-\beta)|\Delta IMEP_{net}| \quad (13)$$

It will be appreciated that the steady-state determination (equation (10)) can be performed using the "magvar" function rather than the variance as discussed.

Once again, during initialisation, the value of $\beta$ is increased from 0 to a final value over a number of cycles, according to equation (11).

During engine start-up spark timing is controlled by varying $\theta_{50}$ such that this value converges onto a target value which defines the combustion stability margin. This target value is set during engine calibration according to known techniques. It will be seen that the algorithm represented by FIG. 14a includes the basic control blocks described above with reference to FIG. 5, however the value $\theta_{50ideal}$ is treated as a nominal target crank angle $\theta_{50nominal}$ for 50% MFB, corrected by an additional value $\Delta\theta_{50sc}$ which it will be appreciated has the basic effect of retarding the spark timing as required during start-up. For each engine cycle, magvar $(\Delta IMEP_{net})$ is calculated from equations 9, 11a, 13a and 13b at block 130. A target magvar$(\Delta IMEP_{net})$ is derived at block 132 representative of the stability margin and these two values are compared at 134. Integral control is applied at block 136 and a value $\Delta\theta_{50sc}$ is added to $\theta_{50nominal}$ at block 138. The measured value $\theta_{50real}$ then tracks this value at block 58.

Figure 14B:
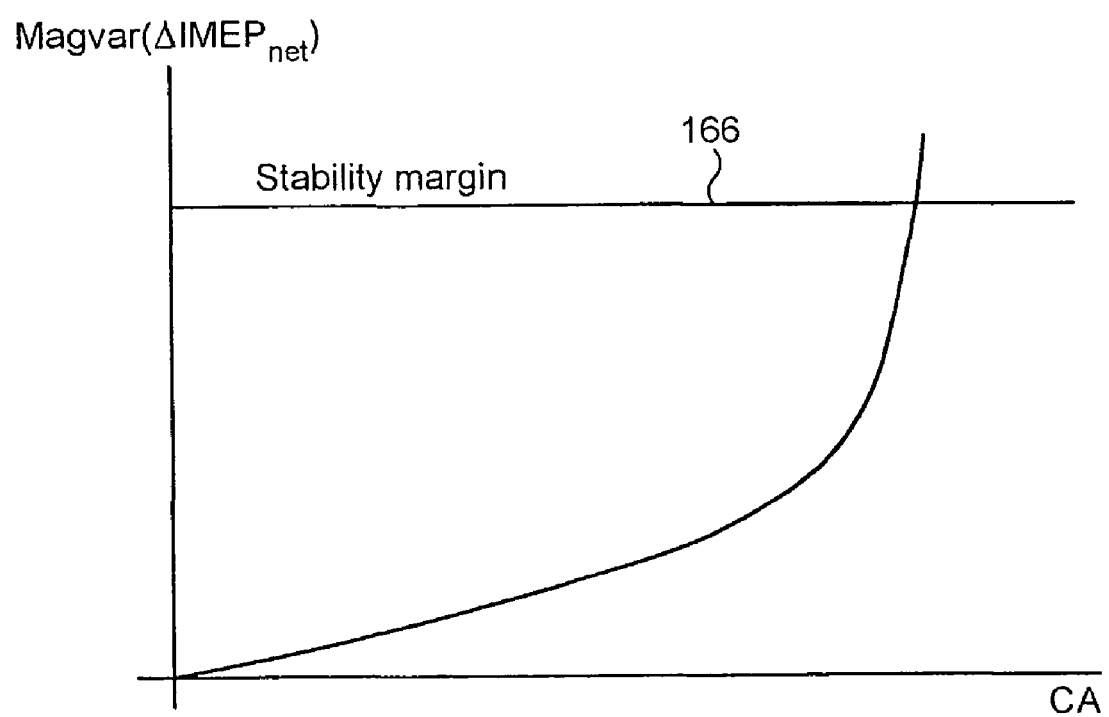
FIG. 14b is a plot showing variation in change of IMEP against spark timing crank angles (CA)

FIG. 14b shows a plot of magvar$(\Delta IMEP_{net})$ against crank angle from which it can be seen that the variance increases rapidly as the crank angle spark timing is retarded beyond a stability margin 166. In physical terms, the later the combustion takes place, the more variation there will be between the energy released between different cycles. As a result it is desirable to retard the engine to an acceptable threshold of combustion stability as discussed in more detail below.

During transient load applications, magvar $(\Delta IMEP_{net})$ will increase as a result of which $\Delta\theta_{50sc}$ will decrease hence advancing the 50% MFB crank angle $\theta_{50}$ providing torque back-up as can be seen from FIG. 14b. To ensure that this advance does not overshoot MBT, i.e. to ensure that the spark timing angle is not advanced so far that it crosses the peak torque point, the minimum integral state is zero i.e. $\Delta\theta_{50sc}$ is always greater than or equal to zero. As a result the target 50% MFB crank angle will not advance beyond the nominal setting $\theta_{50nominal}$.

The system further includes a mode switch block 140 which retains the system in start-up mode as discussed above until the coolant temperature is detected as exceeding a predetermined threshold at block 142. At this point, start-up mode ends and the system tracks $\theta_{50ideal}$ discussed with reference to FIG. 5.

Figure 15:
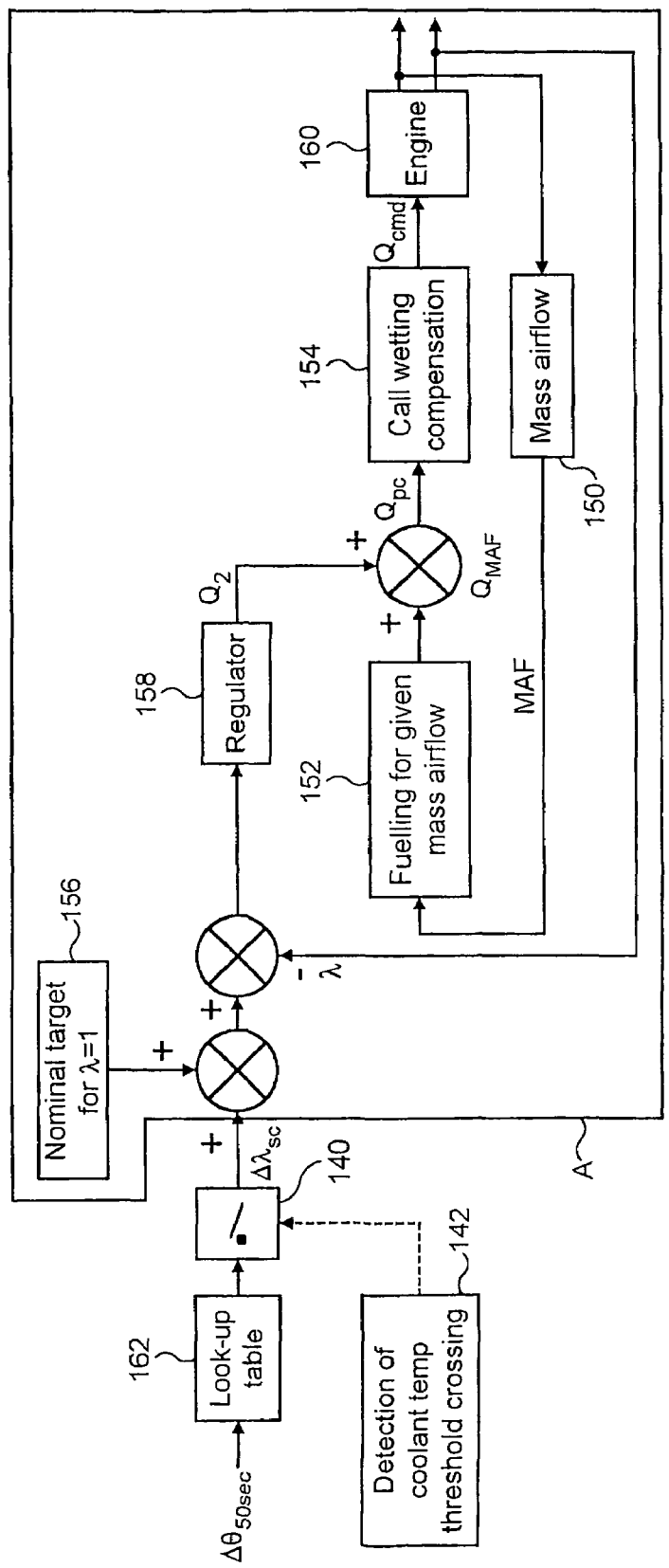
FIG. 15 is a block diagram showing feedback control of air to fuel ratio during engine start up.

A further consideration during engine start-up is control of the level of hydrocarbon emissions. It is known that, to keep the level acceptable during start-up, the target air to fuel ratio AFR is increased (i.e. made lean as the proportion of fuel effectively drops). This results in the reduction of the quantity of fuel injected in each cylinder. This is achieved according to the invention as shown in FIG. 15 by controlling the factor $\lambda$, the ratio of AFR to stoichiometric AFR.

For a fully warmed engine, the $\lambda$ controller is based on two feed-back control loops, mass air flow (MAF) and $\lambda$, as shown in the portion of the system designated A. The mass air flow (MAF) is measured at block 150 which can be a measurement from the mass air flow sensor or an estimate based on the cylinder pressure signals in any appropriate known manner. At block 152 this value is multiplied by a fixed constant based on stoichiometric AFR to give the fuel quantity $Q_{MAF}$. Dynamic compensation is applied at block 154 to compensate for the delay caused by fuel accumulating on and evaporating off the walls of the inlet ports to the cylinders. This wall-wetting compensation results in the fuel command $Q_{cmd}$.

To enable the three-way catalyst to operate at optimal conversion efficiency, the AFR would have to be controlled to near stoichiometry. Accordingly, the λ feed-back route is used based on the nominal target $\lambda \cong 1$ at block 156 which would be expressed as a look-up table function against engine condition. A regulator (which can be a proportional/integral controller, modified to induce the oscillations required for effective catalytic conversion) 158 provides a correcting factor $Q_\lambda$ (to trim any errors in the mass air flow) based on the value of λ derived from the engine 160 against the target value $\lambda \cong 1$. This is a relatively slow feedback control loop because of a transport delay of exhaust gas to the lambda sensor, located on the exhaust pipe. It will be appreciated that the measurement of the value of lambda can be carried out using known sensors as will be apparent to the skilled person, for example a Heated Exhaust Gas Oxygen (HEGO) sensor or a Universal Exhaust Gas Oxygen (UEGO) sensor, and the latter is used in the preferred embodiment.

During a cold start, when it is necessary to increase the AFR to make the fuel mix lean, in other words setting λ>1, a bias $\Delta\lambda_{sc}$ is provided at block 162 and added to the nominal target value determined at block 156. This value is derived from a look-up table function against the $\theta_{50}$ cold start correction value $\Delta\theta_{50sc}$ derived as discussed with regard to FIG. 14a. The relationship between $\Delta\theta_{50sc}$ and $\Delta\lambda_{sc}$ is well known and a look-up table accordingly derived from known relationships and/or calibration stage. In particular as $\Delta\theta_{sc}$ increases, corresponding to additional retard, combustion becomes less stable and hydrocarbons increase. As a result the AFR λ and hence $\Delta\lambda_{sc}$ should also increase. It is further known that the relationship is additionally dependent on coolant temperature which can be a further input to the look-up table, to obtain $\Delta\lambda_{sc}$. The derivation, composition and use of the look-up table will be well known to the skilled person and is not described further here. Mode switch 140 is repeated in this system based on detection of the coolant temperature reaching a predetermined threshold at block 142 such that normal, warmed engine conditions apply once the engine has warmed up and the lambda correction is no longer required.

Figure 16:
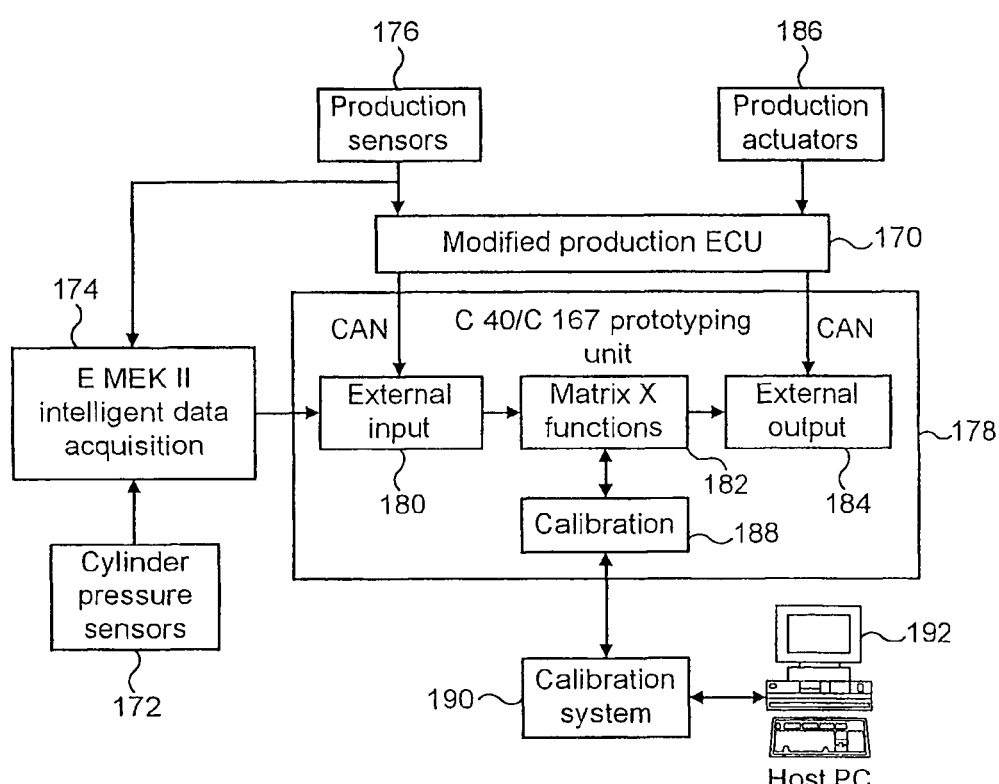
FIG. 16 is a block diagram showing the components of an EMS according to the present invention.
Figure 17:
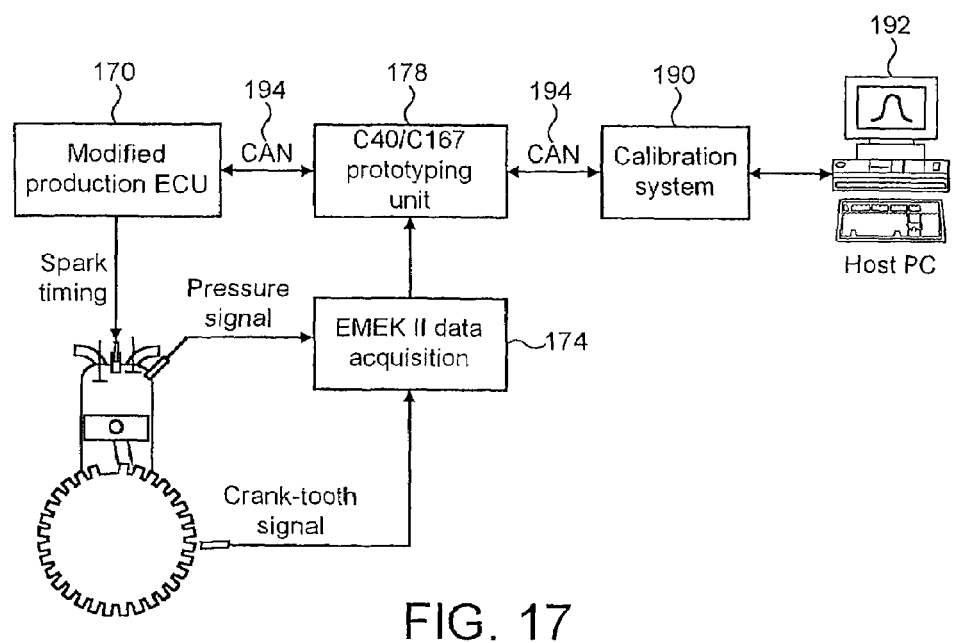
FIG. 17 is a block diagram showing individual cylinder control in an EMS according to the present invention.

A platform for an engine management system according to the present invention is described with reference to FIGS. 16 and 17 for a system monitoring the pressures in all six cylinders of a Mercedes Benz M112 engine and providing information concerning fuel quantity and spark timing which override the corresponding outputs of a production engine control unit 170.

Cylinder pressure sensors 172 are digitised by processing means comprising in the preferred embodiment an EMEK II intelligent data acquisition system 174. The data acquisition system also receives signals from production sensors 176 which may include, for example, a mass air flow sensor, inlet temperature sensor, cam sensor, air/fuel ratio or lambda sensor or any other appropriate sensors of known type. As can be seen from FIG. 17 the data acquisition system 174 yet further receives a crank tooth signal providing a value of the crank angle (CA).

The digitised signals from the data acquisition system 174 are transmitted to a control and diagnostics unit 178 which may comprise a C40/C167 prototyping unit developed by Hema Elektronik GmbH of Germany. The control and diagnostics unit 178 further receives data including production sensor data from production engine control unit 170 and all input data is received in external input block 180. The control and diagnostics algorithms are configured, in the preferred embodiment, in MatrixX/SystemBuild, a high level simulation and algorithm development tool, and downloaded as compiled code to two digital signal processing (DSP) boards generally designated 182. The processed control data is transmitted from an external output block 184 of the control and diagnostics unit 178 to the modified production engine control unit 170 which controls the production actuators including, for example spark plugs and fuel injectors according to their control systems and algorithms discussed above.

It will be seen that the control and diagnostics unit 178 further includes a calibration block 188 which interfaces with an external calibration system 190 connected, for example, to a host PC 192. The calibration system 190 can carry out various calibration steps. For example a target map for 50% MSB ($\theta_{50ideal}$) can be obtained by varying the spark timing at fixed engine speed and load and locating the 50% MFB corresponding to MBT. Furthermore the variants of the IMEP threshold for detecting steady state conditions can be calibrated by running the engine at steady state over a wide range of conditions. The forgetting factor (β) by transient load changes can be calibrated. Misfire detection thresholds can be detected by generating misfires. It will be appreciated that any other appropriate calibration steps can equally be performed.

Figure 18:
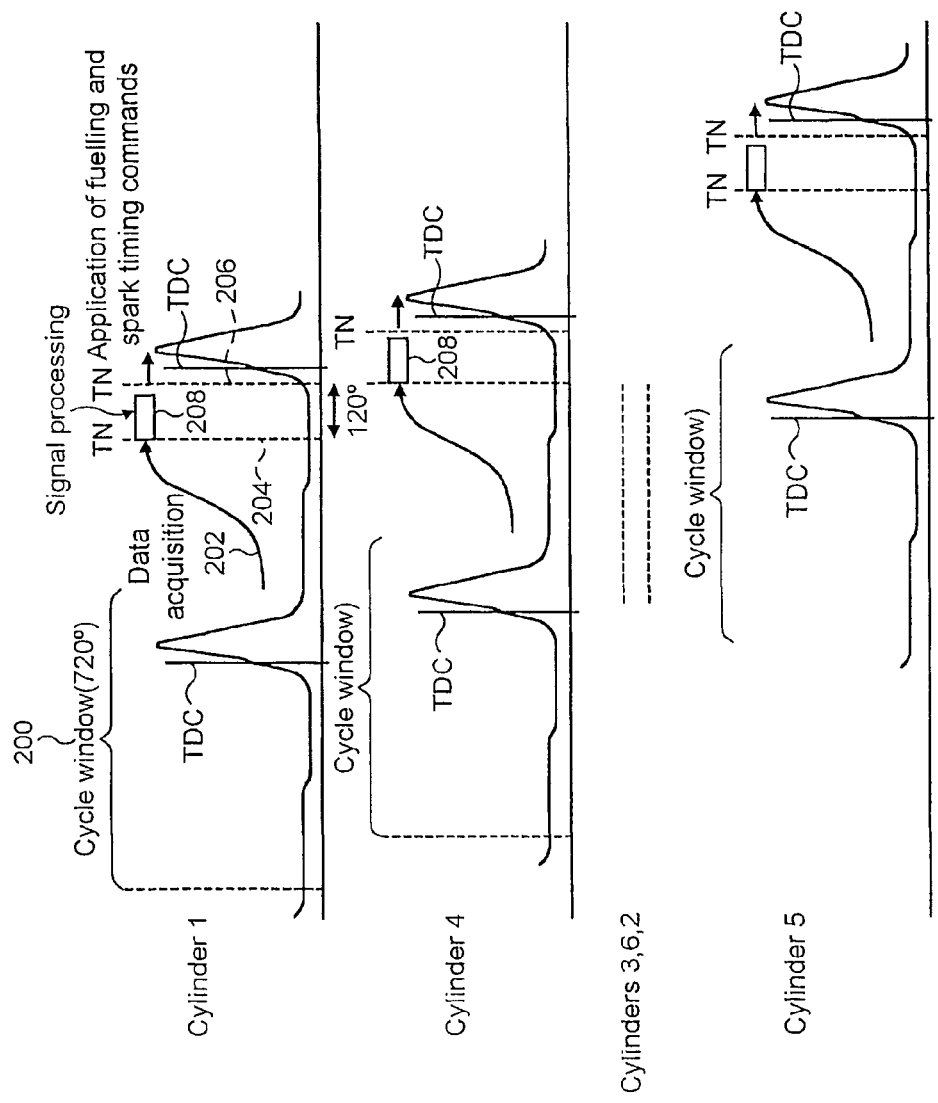
FIG. 18 shows the pressure cycles for selected cylinders in a six-cylinder engine.

Each of the two DSP's shown generally at block 182 run separate cylinder pressure based EMS algorithms. The first set of algorithms are crank synchronous and triggered to run on a first of the DSP's, DSPA. These are the pressure data gathering and processing sequences discussed above in relation to misfire detection and spark timing in cold start, fuel efficiency and smooth running modes. As can be seen in FIG. 18 these algorithms run over a 720° cycle window for each cylinder and are triggered for successive cylinders at 120° crank angle (CA) intervals.

The plot in FIG. 18 is of cylinder pressure against crank angle and it will be seen that, for each cylinder, the cycle window 200 runs over a full 720° cycle from a crank angle significantly before TDC to a crank angle shortly after TDC. This is followed by a data acquisition period 202 allowing the finite processing time required which runs up to a first "TN interrupt" 204. A second TN interrupt 206 occurs 120° later. The fuelling and spark timing commands derived from the data acquired in the previous cycle window are applied at the second interrupt 206 as a result of which signal processing 208 must take place within the interval between the first and second interrupts. It will be noted that as the engine speed increases, although the crank angle interval between the first and second interrupts remains the same, in the time domain the interval decreases accordingly such that the signal processing step 208 must be implemented efficiently so as not to overlap the second TN interrupt. For example referring to the second plot of FIG. 18, in cylinder 4, it will be seen that the signal processing step 208 is carried out at a higher engine speed and hence falls closer to the second TN interrupt.

The ordering of the cylinders in FIG. 18 is 1, 4, 3, 6, 2, 5 and as discussed above all of these algorithms run on DSPA (not shown).

The remaining algorithm runs on a second DSP, DSPB used for detecting engine knock. The algorithm receives time synchronous pressure signals at 40 kHz sample frequency and outputs knock intensities for all six cylinders to DSPA, where the knock detection routines discussed above are carried out. DSPB is time synchronous rather than crank synchronous because the knock frequency is not related to the crank angle but other parameters such as bore size and combustion temperature.

In the preferred embodiment the fuelling and spark timing commands generated from DSPA in control and diagnostics unit 178 are transmitted via the control area network (CAN) bus 194 to the production ECU 170 where they bypass the normal commands generated by the production control algorithms. As a result the system can be "bolted on" in a preferred embodiment to an existing production ECU 170 with the logic appropriately modified to allow priority to the modified system in controlling production actuators, namely the fuel injectors and spark plugs.

It will be seen that the invention provides a range of advantages and solutions to problems in existing systems. Incorporation of a mathematical description or model describing the dynamic as well as the steady state behaviour of the engine requires less calibration effort and provides real time control. The processing of the in-cylinder pressure data allows engine control and diagnostics with a reduced number of sensors; in particular, as discussed above, sensors such as the mass air flow sensor, knock detection sensor can be optional without compromising engine control according to the present invention. In addition the cam sensor can be replaced as the cylinder pressure sensor can detect which stroke each cylinder is performing from the pressure changes detected for each stroke, even during start-up before ignition, rather than identifying the cylinder phase from the cam position.

It will further be recognised that the processing of pressure data as discussed above can be applied to additional or alternative engine states including idle speed control and engine power-up.

It will be recognised that although the discussion of the invention is directed to a six-cylinder, four-stroke engine, it can equally be applied in engine types of different configurations, stroke cycles and cylinder numbers. Yet further the invention can be applied to different fuel-type or combustion-type internal combustion engines including natural gas engines and diesel engines of spark and compression ignition type. In those cases the in-cylinder pressure data can be processed generally as discussed above to obtain data on equivalent parameters to establish, for example, the IMEP and crank angle at 50% MFB or other known measures of engine performance for the alternative engine-types. This data can then be applied to appropriate actuation points such as fuel injection in the diesel cycle.

The invention claimed is:

1. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle or cycles and derive control data therefrom for the actuator controller, in which the processor derives an offset pressure value from the cylinder pressure data.

2. A system as claimed in claim 1 in which the processor processes cylinder pressure data for each cylinder in the engine.

3. A system as claimed in claim 1 in which the processor processes cylinder pressure data for each engine cycle.

4. A system as claimed in claim 3 in which the actuator controller controls actuation for an engine cycle based on the processed cylinder pressure data from the engine cycle immediately preceding.

5. A system as claimed in claim 1 in which the processor further processes crank angle data.

6. A system as claimed in claim 5 for a multi-cylinder engine in which data is obtained for each cylinder at a respective crank angle position in the cycle or cycles of each cylinder.

7. A system as claimed in claim 1 further including an in cylinder pressure sensor for providing cylinder pressure data to the data processor.

8. A system as claimed in claim 1 further comprising an engine actuator comprising at least one of: a spark plug; a fuel injector.

9. A system as claimed in claim 1 in which the cylinder pressure data is filtered.

10. A system as claimed in claim 1 in which the offset pressure value is derived from the polytropic gas law $PV^n = K$ using cylinder pressure data and corresponding volume data to obtain n and K.

11. A system as claimed in claim 1 in which the processor derives a pressure ratio function from the constructed pressure variation function comprising a ratio between combustion and motoring pressure.

12. A system as claimed in claim 11 in which the processor derives the motoring pressure for each engine cycle or cycles from the pressure sensor data in a pre-combustion phase of the engine cycle(s).

13. A system as claimed in claim 12 in which the motoring pressure derivation is based on filtered pressure sensor data.

14. A system as claimed in claim 11 in which the engine actuator comprises a spark plug and the actuator controller controls the timing of firing the spark plug based on closed loop control of a pressure ratio control variable.

15. A system as claimed in claim 14 in which the pressure ratio control variable is a fixed proportion of the fuel Mass Fraction Burnt (MFB).

16. The system as claimed in claim 15 wherein the fixed proportion of the fuel Mass Fraction Burnt is 50% MFB.

17. A system as claimed in claim 11 for a multi-cylinder engine in which the pressure ratio is derived for each engine cylinder and the actuator controller controls an actuator for each engine cylinder.

18. A system as claimed in claim 11 in which the processor processes the pressure sensor data to obtain the indicated mean effective pressure (IMEP).

19. A system as claimed in claim 18 for a multi-cylinder engine in which the processor obtains the IMEP for each cylinder, identifies as the weakest cylinder the cylinder having the lowest IMEP and the actuator control controls each cylinder to balance the IMEP to that of the weakest cylinder.

20. A system as claimed in claim 19 in which the cylinders are controlled by adjusting the spark timing for each cylinder.

21. A system as claimed in claim 20 in which the cylinder balancing is based on closed loop control.

22. A system as claimed in claim 18 in which the processor obtains the gross IMEP and detects misfire if the gross IMEP falls below a threshold value.

23. A system as claimed in claim 22 in which, on misfire detection, the actuator controller resets to an actuator controller state prior to misfire detection.

24. A system as claimed in claim 18 in which the processor further derives a function of the variance of IMEP between engine cycles and compares the function against a threshold value to determine whether a steady state condition exists.

25. A system as claimed in claim 24 in which the processor switches from IMEP balancing if non-steady state is determined.

26. A system as claimed in claim 24 in which the IMEP variance or variability is derived iteratively as a function of a preceding variance or variability value and a current IMEP value coupled with a forgetting factor.

27. A system as claimed in claim 26 in which the IMEP variance or variability iteration includes an initialization sequence in which the forgetting factor is successively increased for each iteration to a target value.

28. A system as claimed in claim 18 in which, in a start-up mode, the processor derives a function of the variability of IMEP between engine cycles and compares the function against a threshold value, and the actuator controller controls the actuator based on this comparison.

29. A system as claimed in claim 28 in which the actuator is a spark plug and the actuator controller retards the spark plug timing based on the comparison.

30. A system as claimed in claim 28 in which a further actuator comprises a fuel injector and the actuator controller controls fuel injection based on the function of the IMEP variability.

31. A system as claimed in claim 28 in which the actuator control is performed under closed loop control to a target IMEP variability.

32. A system as claimed in claim 28 in which the start-up mode is entered based on engine coolant temperature sensor data.

33. A system as claimed in claim 22 in which the threshold value is based on an average of the IMEPs obtained for all cylinders, other than the current cylinder for which misfire is being detected, during the same cycle.

34. A system as claimed in claim 1 in which the processor further processes pressure sensor data to detect cylinder knock.

35. A system as claimed in claim 34 in which the actuator comprises a spark plug, and the processor and actuator controller, upon knock detection, retard the spark plug timing and incrementally increase the timing for subsequent engine cycles until a spark timing threshold is reached.

36. A system as claimed in claim 35 in which the actuator controller resets an actuator controller state prior to knock detection once the spark timing threshold is reached.

37. An internal combustion engine including at least one cylinder pressure sensor, at least one engine actuator and an engine management system as claimed in claim 1.

38. A diagnostic system for an internal combustion engine as claimed in claim 1, having at least one cylinder pressure sensor and a processor arranged to process sensed cylinder pressures over a cylinder cycle and construct a cylinder pressure variation function, the system further comprising a processor arranged to detect engine misoperation from the constructed function.

39. A system as claimed in claim 38 in which engine misoperation includes at least one of engine faults, inlet manifold leaks, inlet or exhaust valve leaks, piston ring failure or leakage and head gasket leakage.

40. A system as claimed in claim 38 in which the misoperation processor identifies engine misoperation by comparison of the constructed function with a modelled function.

41. A system as claimed in claim 38 in which the processor identifies engine misoperation using pattern recognition.

42. A system as claimed in claim 38 in which the engine has a plurality of cylinders and respective cylinder pressure sensors, and the processor cross-correlates constructed functions for each cylinder to identify faults common to multiple cylinders.

43. An engine management system for an internal combustion engine having a plurality of cylinders each having at least one cylinder pressure sensor and at least one engine actuator, the system comprising a data processor arranged to process cylinder pressure data from each pressure sensor in which the processor constructs a cylinder pressure variation function for each cylinder from the cylinder pressure data, derives a measure of the performance of each cylinder from the respected pressure variation function and balances the cylinder performances, by means of identifying the weakest cylinder and retarding the timing on the other cylinders to match the work done by the weakest cylinder.

44. A system as claimed in claim 43 further comprising an actuator controller arranged to control each cylinder actuator to balance cylinder performance.

45. A system as claimed in claim 44 in which the actuator controller controls the cylinder spark timing.

46. A method of managing an internal combustion engine based on cylinder pressure data from a cylinder pressure sensor comprising the steps of obtaining the cylinder pressure data across one or more performance optimized engine cycles, processing the cylinder pressure data to construct a pressure variation function for the engine cycle or cycles and controlling an engine actuator to optimize engine performance based on the constructed pressure variation function, and further comprising deriving an offset pressure value from cylinder pressure data.

47. The method as claimed in claim 46 in which the cylinder pressure data is filtered.

48. An engine management system for an internal combustion engine having at least one cylinder pressure sensor, the system comprising a sensor controller arranged to retrieve a plurality of cylinder pressure readings per cylinder cycle and a processor arranged to process the readings to construct a cylinder pressure variation function in which sufficient readings are retrieved per cycle to allow noise filtering in the pressure variation function and further comprising a processor for processing the constructed cylinder pressure variation function to identify at least one of engine faults, inlet manifold leaks, inlet or exhaust valve leaks, piston ring failure or leakage, and head gasket leakage.

49. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle or cycles and derive control data therefrom for the actuator controller, in which the processor processes the pressure sensor data to obtain an indicated mean effective pressure (IMEP).

50. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle or cycles and derive control data therefrom for the actuator controller, in which the processor obtains a gross indicated mean effective pressure (IMEP) and detects misfire if the gross IMEP falls below a threshold value.

51. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle of cycles and derive control data therefrom for the actuator controller, in which the processor further derives a function of the variance of an indicated mean effective pressure (IMEP) between engine cycles and compares the function against a threshold value to determine whether a steady state condition exists.

52. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle of cycles and derive control data therefrom for the actuator controller, in which in a start-up mode, the processor derives a function of the variability of an indicated mean effective pressure (IMEP) between engine cycles and compares the function against a threshold value, and the actuator controller controls the actuator based on the comparison.

53. An engine management system for an internal combustion engine having at least one cylinder pressure sensor and at least one engine actuator, the system comprising a data processor arranged to receive and process cylinder pressure data from the cylinder pressure sensor and an actuator controller arranged to control the actuator to optimize engine performance based on the processed data, in which the cylinder pressure data is obtained during a performance optimized engine cycle or cycles and the processor processes the data to construct a cylinder pressure variation function for the engine cycle of cycles and derive control data therefrom for the actuator controller, in which the processor further processes pressure sensor data to detect cylinder knock.

* * * * *